United States Patent [19]

Gushima et al.

[11] Patent Number: 5,506,825
[45] Date of Patent: Apr. 9, 1996

[54] OPTICAL DISK AND OPTICAL RECORDING AND REPRODUCING APPARATUS

[75] Inventors: Toyoji Gushima, Habikino; Yoshiharu Kobayashi, Kadoma, both of Japan

[73] Assignee: Matsushita Electric Industrial Co., Ltd., Osaka, Japan

[21] Appl. No.: 297,871

[22] Filed: Aug. 30, 1994

[30] Foreign Application Priority Data

Sep. 10, 1993 [JP] Japan .................................. 5-225496

[51] Int. Cl.⁶ ..................................................... G11B 7/00
[52] U.S. Cl. ........................ 369/49; 369/48; 369/44.37; 369/124; 369/58; 369/59
[58] Field of Search ................................. 369/48, 49, 50, 369/53, 54, 58, 59, 60, 13, 124, 44.37, 44.38, 83, 84, 93; 358/342, 343, 335

[56] References Cited

U.S. PATENT DOCUMENTS

| | | | |
|---|---|---|---|
| 4,399,471 | 8/1983 | Preuss | 369/93 |
| 4,768,104 | 8/1988 | Kanamaru | 358/342 |
| 4,873,679 | 10/1989 | Murai et al. | 369/93 X |
| 5,077,715 | 12/1991 | Mizokami et al. | 369/32 |
| 5,130,863 | 7/1992 | Yamashita et al. | 369/48 X |
| 5,206,847 | 4/1993 | Kanda | 369/44.13 |
| 5,253,242 | 10/1993 | Satoh et al. | 369/44.37 X |
| 5,420,690 | 5/1995 | Koishi | 369/84 X |

FOREIGN PATENT DOCUMENTS

| | | |
|---|---|---|
| 0487296 | 5/1992 | European Pat. Off. . |
| 0521454 | 1/1993 | European Pat. Off. . |
| 63-161564 | 7/1988 | Japan . |
| 63-161532 | 7/1988 | Japan . |
| 63-161533 | 7/1988 | Japan . |
| 4-170756 | 6/1992 | Japan . |
| 4-252427 | 9/1992 | Japan . |
| 5-62357 | 3/1993 | Japan . |
| 6162557 | 6/1994 | Japan . |

*Primary Examiner*—Georgia Y. Epps
*Assistant Examiner*—Muhammad N. Edun
*Attorney, Agent, or Firm*—Wenderoth, Lind & Ponack

[57] ABSTRACT

An optical disk is divided in a radial direction into an inner area and an outer area each having formed therein spiral or concentric tracks each having a sector which has an address area, an audio signal recording area and a video signal recording area. A specific unit of audio signal and a specific unit of video signal are divided into a plurality of audio blocks and a plurality of video blocks, respectively. Each of the audio blocks and the video blocks are separated into a first group and a second group. The audio blocks and video blocks in the first group are respectively recorded into the audio signal recording area and the video signal recording area in a sector in the inner area, and the audio blocks and video blocks in the second group are respectively recorded into the audio signal recording area and the video signal recording area in a sector in the outer area.

8 Claims, 16 Drawing Sheets

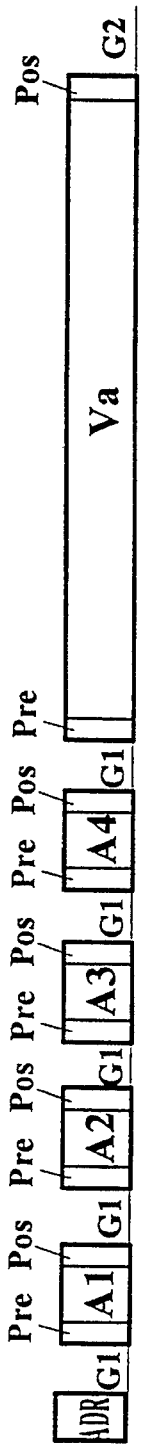
FIG.3a
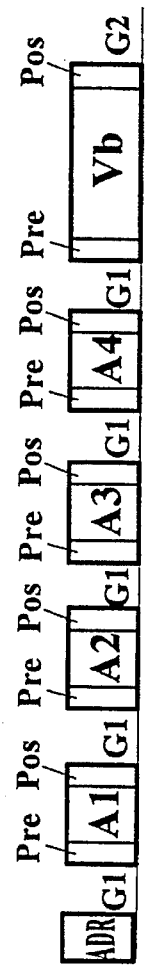
FIG.3b
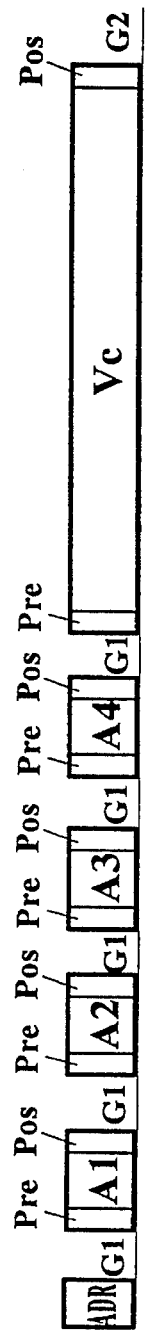
FIG.3c
FIG.3d
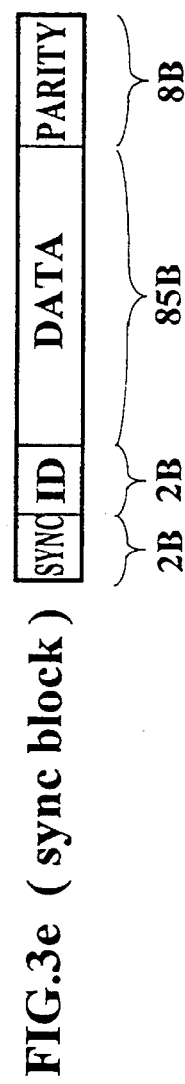
FIG.3e (sync block)

FIG.4

| Zone No. | Radius (mm) | Rec Frequency (MHz) | Video Sync Blocks | Zone No. | Radius (mm) | Rec Frequency (MHz) | Video Sync Blocks |
|---|---|---|---|---|---|---|---|
| $Z_i0$ | 44~47 | 22.3 | 101 | $Z_o0$ | 137~140 | 67.7 | 307 |
| $Z_i1$ | 47~50 | 23.7 | 108 | $Z_o1$ | 134~137 | 66.3 | 300 |
| $Z_i2$ | 50~53 | 25.2 | 114 | $Z_o2$ | 131~134 | 64.8 | 294 |
| $Z_i3$ | 53~56 | 26.7 | 121 | $Z_o3$ | 128~131 | 63.3 | 287 |
| $Z_i4$ | 56~59 | 28.1 | 128 | $Z_o4$ | 125~128 | 61.9 | 280 |
| $Z_i5$ | 59~62 | 29.6 | 134 | $Z_o5$ | 122~125 | 60.4 | 274 |
| $Z_i6$ | 62~65 | 31.1 | 141 | $Z_o6$ | 119~122 | 58.9 | 267 |
| $Z_i7$ | 65~68 | 32.5 | 147 | $Z_o7$ | 110~113 | 57.5 | 261 |
| $Z_i8$ | 68~71 | 34.0 | 154 | $Z_o8$ | 116~119 | 56.0 | 254 |
| $Z_i9$ | 71~74 | 35.5 | 161 | $Z_o9$ | 113~116 | 54.5 | 247 |
| $Z_i10$ | 74~77 | 36.9 | 167 | $Z_o10$ | 107~110 | 53.1 | 241 |
| $Z_i11$ | 77~80 | 38.4 | 174 | $Z_o11$ | 104~107 | 51.6 | 234 |
| $Z_i12$ | 80~83 | 39.9 | 181 | $Z_o12$ | 101~104 | 50.1 | 227 |
| $Z_i13$ | 83~86 | 41.3 | 187 | $Z_o13$ | 98~101 | 48.7 | 221 |
| $Z_i14$ | 86~89 | 42.8 | 194 | $Z_o14$ | 95~98 | 47.2 | 214 |
| $Z_i15$ | 89~92 | 44.3 | 201 | $Z_o15$ | 92~95 | 45.7 | 207 |

FIG.5

| Seq. No. | Uo head | Li head | Lo head | Ui head |
|---|---|---|---|---|
| 0 | Zo0 | Zi0 | Zo15 | Zi15 |
| 1 | Zo1 | Zi1 | Zo14 | Zi14 |
| 2 | Zo2 | Zi2 | Zo13 | Zi13 |
| 3 | Zo3 | Zi3 | Zo12 | Zi12 |
| 4 | Zo4 | Zi4 | Zo11 | Zi11 |
| 5 | Zo5 | Zi5 | Zo10 | Zi10 |
| 6 | Zo6 | Zi6 | Zo9 | Z19 |
| 7 | Zo7 | Zi7 | Zo8 | Zi8 |
| 8 | Zo8 | Zi8 | Zo7 | Zi7 |
| 9 | Zo9 | Zi9 | Zo6 | Zi6 |
| 10 | Zo10 | Zi10 | Zo5 | Zi5 |
| 11 | Zo11 | Zi11 | Zo4 | Zi4 |
| 12 | Zo12 | Zi12 | Zo3 | Zi3 |
| 13 | Zo13 | Zi13 | Zo2 | Zi2 |
| 14 | Zo14 | Zi14 | Zo1 | Zi1 |
| 15 | Zo15 | Zi15 | Zo0 | Zi0 |

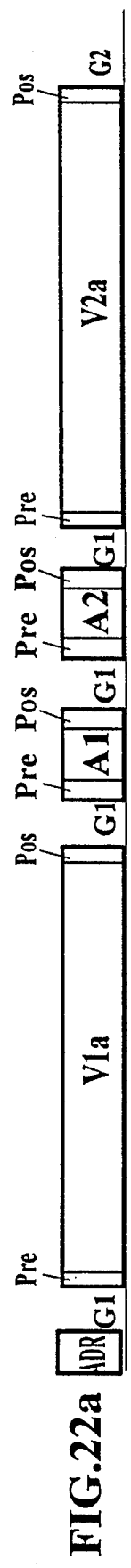
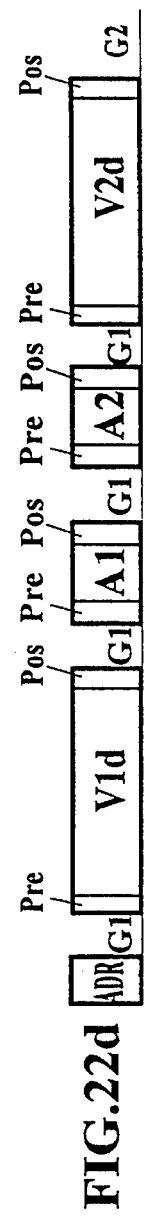
FIG.22a
FIG.22b
FIG.22c
FIG.22d

OPTICAL DISK AND OPTICAL RECORDING AND REPRODUCING APPARATUS

BACKGROUND OF THE INVENTION

1. Field of the Invention

The present invention relates to an optical disk for recording therein video signal and audio signal, and an optical recording and reproducing apparatus for recording and reproducing video and audio signals onto and from the optical disk.

2. Description of the Prior Art

Recently, the optical disk is noticed as an information recording medium of large storage capacity and fast access speed. Known optical disk recording methods include a constant linear velocity (CLV) method in which the rotating speed of a disk is varied in inverse proportion to the track radius so that the linear velocity of the track may be constant anywhere on the disk, a constant angular velocity (CAV) method in which the disk is rotated at a constant angular velocity, a modified CLV (MCLV) method, and a modified CAV (MCAV) method. The MCAV method is a recording method in which the rotating speed of the disk is kept constant, the recording area is divided into plural regions called zones in the radial direction of the disk, and the clock frequency for recording is varied zone by zone so as to be higher as going closer to the outer circumference so that the recording mark length becomes almost the same at the outer side and at the inner side. In the MCAV method, since the rotating speed of the disk is constant, the control of rotation of the spindle motor for rotating the disk is easy, and the sector position can be specified radially from the center of the disk, so that it is excellent in random access performance. Moreover, since the recording mark length is the same at the inner side and at the outer side the recording capacity can be increased, which improves the defect of shortage of storage capacity in the CAV method.

In the audio-video field, on the other hand, by making use of the excellent random access performance, the optical disk has been applied in an editing machine capable of easily post-scoring or pre-scoring only audio signal or video signal, or only a specific channel among plural channels.

In the MCAV method, however, since the linear velocity is faster and the recording frequency is higher at the outer side as compared with the inner side, the jitter is worsened at the outer side as compared with the inner side, thereby resulting in a difference in the recording and reproducing characteristic.

SUMMARY OF THE INVENTION

It is hence a primary object of the invention to present an optical disk, an optical recording method, an optical recording apparatus, an optical reproducing apparatus, and an optical recording and reproducing apparatus capable of recording and reproducing audio signal and video signal without being influenced by the difference in recording and reproducing characteristic at the inner side and outer side in the MCAV method and capable of post-scoring and pre-scoring only necessary audio signal or video signal in program editing, in a simple constitution.

To achieve the above object, an optical disk of the invention has opposite sides at least one of which is divided in a radial direction into an inner area closer to a center of the disk and an outer area closer to an outer circumference of the disk, each of the inner and outer areas having formed therein spiral or concentric tracks each having at least one sector which has an address area having recorded therein address information identifying the sector, an audio signal recording area for recording therein an audio signal and a video signal recording area for recording therein a video signal.

A method of the Invention for recording audio and video signals on such an optical disk comprises the steps of: rotating the optical disk substantially at a constant angular velocity; dividing a specific unit of audio signal into a plurality of audio blocks and a specific unit of video signal into a plurality of video blocks, respectively; separating the plurality of audio blocks into a first group of audio blocks and a second group of audio blocks and the plurality of video blocks into a first group of video blocks and a second group of video blocks; and recording with a light beam applied to the optical disk the first group of audio blocks and the first group of video blocks respectively into the audio signal recording area and the video signal recording area in at least one sector in the inner area and the second group of audio blocks and the second group of video blocks respectively into the audio signal recording area and the video signal recording area in at least one sector in the outer area. The inner area of the optical disk may be divided in a radial direction from an innermost circumference to an outermost circumference of the inner area into a plurality of zones, and the outer area of the optical disk is divided in a radial direction from an outer-most circumference to an innermost circumference of the outer area into a plurality of zones. The frequency of the recording clock signal may be varied zone by zone to increase in the direction of the sequential order of the zones in each of the inner and outer areas.

An optical recording apparatus of the invention for recording video signals and audio signals on the above-described optical disk comprises: disk drive means for rotating the optical disk at a constant angular velocity; a first optical head for accessing a sector in the inner area of the optical disk with a converged light to record a signal applied thereto onto the accessed sector; a second optical head for accessing a sector in the outer area of the optical disk with a converged light to record a signal applied thereto onto the accessed sector; audio signal encoding means for encoding a specific unit of an input audio signal to obtain a coded audio data; video signal encoding means for encoding a specific unit of an input video signal to obtain a coded video data; data distributing means for distributing each of the coded audio data and the coded video data to a first group of video data and audio data and a second group of audio data and video data at a specific distribution ratio; a first modulating an recording means for modulating the first group of audio data and video data to obtain a first group of modulated audio data and modulated video data, and for applying the first group of modulated audio data and modulated video data to the first optical head to record the modulated audio data and the modulated video data in the first group into the audio signal recording area and the video signal recording area, respectively in a sector in the inner area of the optical disk; and a second modulating and recording means for modulating the second group of audio data and video data to obtain a second group of modulated audio data and modulated video data, and for applying the second group of modulated audio data and modulated video data to the second optical head to record the modulated audio data and the modulated video data in the second group into the audio signal recording area and the video signal recording area, respectively in a sector in the outer area of the optical disk.

An optical recording and reproducing apparatus of the invention comprises a recording part which has the same structure as the recording apparatus described above and a reproducing part. The first optical head has an additional function to reproduce from the accessed sector the first group of modulated coded audio data and the first group of modulated coded video data, and the second optical head has an additional function to reproduce from the accessed sector the second group of modulated coded audio data and the second group of modulated coded video data. The reproducing part comprises: a first demodulating means for demodulating the first group of modulated coded audio data and the first group of modulated coded video data reproduced by the first optical head to obtain a first group of coded audio data and a first group of coded video data; a second demodulating means for demodulating the second group of modulated coded audio data and the second group of modulated coded video data reproduced by the second optical head to obtain a second group of coded audio data and a second group of coded video data; data combining means for combining the first group of coded audio data and the second group of coded audio data to obtain a combined coded audio data and for combining the first group of coded video data and the second group of coded video data to obtain a combined coded audio data; audio decoding means for decoding the combined coded audio data to obtain a reproduced audio signal; and video decoding means for decoding the combined coded video data to obtain a reproduced video signal.

The invention, with such optical disk and apparatus constitution, is capable of recording audio signal and video signal of a specific unit in a specific period time by dispersing in the inner area and outer area. Therefore, in spite of the MCAV method, the recording and reproducing results due to difference in recording and reproducing characterIstic are averaged between the inner area and outer area of the optical disk.

According to the constitution of the invention, by recording and reproducing by time sharing by separating the audio signal recording area and video signal recording area on the time axis, the audio signal and video signal can be recorded and reproduced independently at a time difference. Therefore, post-scoring of audio signal or video signal only, or pre-scoring of audio signal or video signal only can be realized in a simple constitution.

When recording audio signals or video signals of plural channels into individual audio signal recording areas or video signal recording areas corresponding to the channels, it is possible to record or reproduce by selecting only an arbitrary audio channel or video channel. Therefore, postscoring or pre-scoring of audio signals in plural channels and arbitrary channel of video channels can be easily realized.

Moreover, the inner area and outer area of the optical disk may be further divided into plural zones, and the length of each audio signal recording region and video signal recording region in the sector may be varied zone by zone. By using the optical disk having such format, each of the audio signal and video signal of a specific unit is divided into a specified number of blocks, and recorded by distributing the audio blocks and video blocks in a zone of the inner area and a zone of the outer area. Therefore, only by varying the distribution ratio of the number of blocks in the inner and outer areas, audio signals and video signals of specific data rate can be recorded and reproduced easily.

BRIEF DESCRIPTION OF THE DRAWINGS

FIG. 3a is a diagram showing a signal format on a sector of an upper outer area of the optical disk when recording four channels of audio signals and one channel of video signal.

FIG. 3b is a diagram showing a signal format on a sector of a lower inner area.

FIG. 3c is a diagram showing a signal format on a sector of a lower outer area.

FIG. 3d is a diagram showing a signal format on a sector of an upper inner area.

FIG. 3e is a diagram showing data composition of a sync block which is a recording unit of audio signals and video signals in an embodiment of the invention.

FIG. 4 is a table showing the radius of innermost circumference, radius of outermost circumference, recording frequency, and number of video blocks per sector in every zone of optical disk in an embodiment of the invention.

FIG. 5 is a table showing combinations of zones accessed by four optical heads in an embodiment of the invention.

FIG. 22a is a diagram showing an example of signal format on a sector of an upper outer area of an optical disk for recording two channels of audio signals and two channels of video signals.

FIG. 22b is a diagram showing an example of signal format on a sector of a lower inner area of the same optical disk.

FIG. 22c is a diagram showing an example of signal format on a sector of a lower outer area of the same optical disk.

FIG. 22d is a diagram showing an example of signal format on a sector of an upper inner area of the same optical disk.

DESCRIPTION OF THE PREFERRED EMBODIMENTS

Figure 1A:
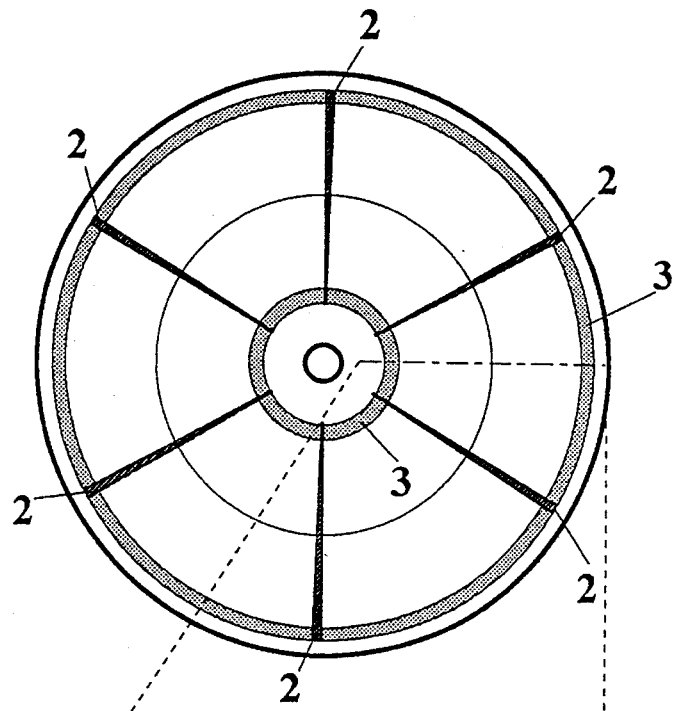
FIG. 1a is a plan view of an optical disk in an embodiment of the invention as seen in the direction of axis of rotation.
Figure 1B:
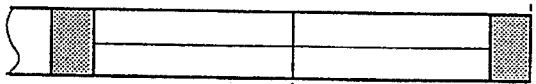
FIG. 1b is a partial sectional view of the same optical disk cut in the radial direction.
Figure 1C:
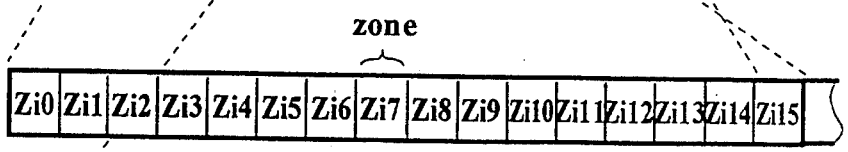
FIG. 1c is a magnified view of FIG. 1b.
Figure 1C:
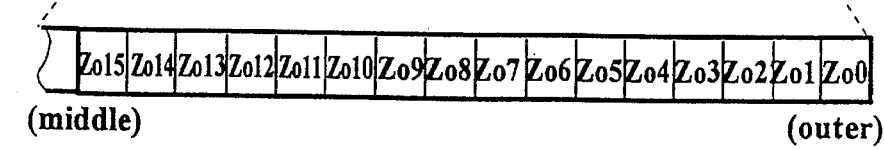

FIGS. 1a to 1c show a track format of an optical disk 1 in an embodiment of the invention. FIG. 1a is a plan view of the optical disk 1 as seen in the direction of axis of rotation, and FIGS. 1b, 1c are sectional views of the optical disk 1 cut in the radial direction. Spiral or concentric tracks are formed on both the opposite sides of the optical disk 1, and each track (one full turn) is divided into six sections at every 60 degrees, where each section is called a sector. The length of the sector varies track by track as clear from the disk shape, becoming longer as going closer to the outer periphery. At the beginning of each sector, an address information region 2 is provided in which the address information such as a track number and a sector number has been preformatted in the form, for example, of undulations of grooves.

The optical disk 1 is also divided in the radial direction. A control information area 3 is provided at each of the innermost area and the outermost area. In the control information area 3, without recording any audio signal and video signal, the information intrinsic to the disk, time code and other control information are recorded. A user area 4 between the two control information areas 3 is an area for recording the audio signal and video signal. The user area 4 is divided into two in the radial direction. Of the two regions, the specific region consisting of a specified number of tracks counted from the innermost track of the user area 4 is called an inner area 5, and the area extending from the outermost end of the inner area 5 in the user area 4 is called an outer area 6. Each of the inner area 5 and outer area 6 is further divided into regions each consisting of plural tracks called zones. In this embodiment, as shown in FIG. 1c, the optical disk 1 is divided into a total of 32 zones, consisting of 16 zones (Zi0 to Zi15) of the inner area 5, and 16 zones (Zo0 to Zo15) of the outer area 6. Each zone is numbered. The zones of the inner area 5 are numbered Zi0, Zi1, ... ,Zi15 from the innermost circumference to the outermost circumference of the inner area 5, and the zones of the outermost area 6 are numbered Zo0, Zo1, ... , Zo15 from the outermost circumference to the innermost circumference of the outer area 6. In the MCAV system, the rotating speed of the disk is constant, and the recording frequency is varied zone by zone to be higher in the outer zones. Therefore, as mentioned above, the sector length is longer and the recording capacity is greater in the outer zones.

Figure 2A:
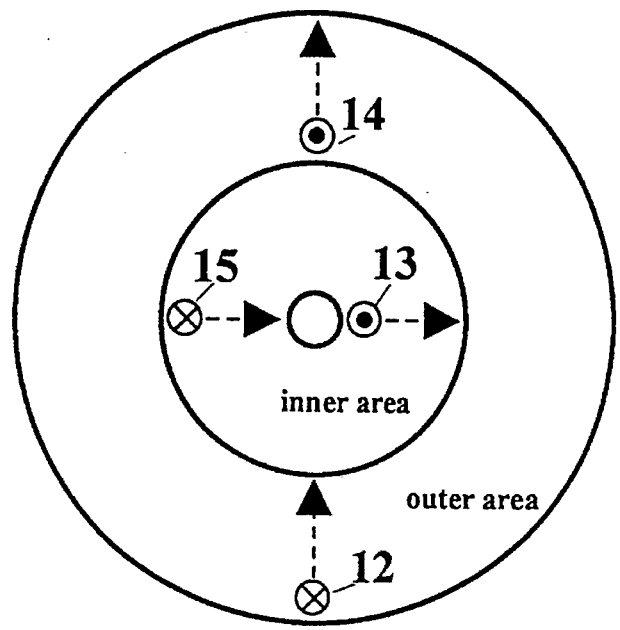
FIG. 2a is a plan view showing arrangement and motion of optical heads with respect to the optical disk seen in the direction of axis of rotation.
Figure 2B:
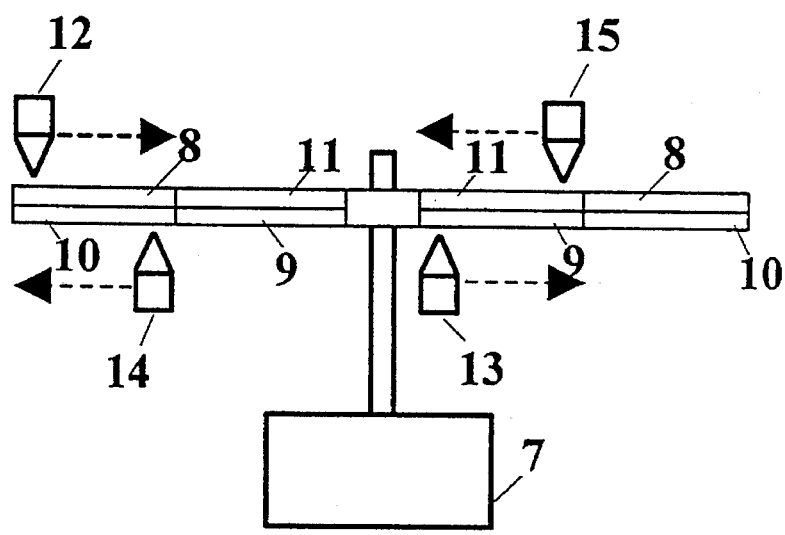
FIG. 2b is a side sectional view showing the arrangement and motion of the optical heads with respect to the optical disk seen in a direction perpendicular to the axis of rotation.

FIGS. 2a, 2b show a layout and movement of optical heads in an embodiment of the invention. FIG. 2a is a plan view of the optical disk 1 and the optical heads for accessing the optical disk 1 as seen in the direction of axis of rotation of the disk. FIG. 2b is a side sectional view of the optical disk 1, optical heads and a spindle motor 7 for rotating the optical disk i at a constant angular velocity as seen in a direction perpendicular to the axis of rotation of the disk. In the disk 1, same as shown in FIG. 1b, tracks are provided on both sides. The control information area 3 is present although not shown in the drawing for the sake of simplification. Herein, of the user area of the optical disk 1, the outer area on the upper side is called an upper outer area 8, the inner area on the lower side is a lower inner area 9, the outer area on the lower side is a lower outer area 10, and the inner area on the upper side is an upper inner area 11.

The four optical heads 12 through 15 access the four divided user areas. The head 12 for accessing the upper outer area 8 is supposed to be an Uo head, the head 13 for accessing the lower inner area 9 to be an Li head, the head 14 for accessing the lower outer area 10 to be an Lo head, and the head 15 for accessing the upper inner area 11 to be Ui head. As shown in FIG. 2a, the four heads are disposed at every 90 degrees. Each optical head records or reproduces while moving in the direction of arrow in the drawing. FIG. 5 is a table for showing an access sequence of each optical head when recording or reproducing on the entire surface of the optical disk 1. In the table, the column direction shows the flow of time from top to bottom, and the row direction indicates the zone numbers to be accessed by the optical heads.

The Uo head 12 records and reproduces in the sequence of Zo0 to Zo1 to Zo2 ... to Zo15 from the outermost track toward the innermost track in the upper outer area 8 of the optical disk 1.

The Li head 13 records and reproduces in the sequence of Zi0 to Zi1 to Zi2 ... to Zi15 from the innermost track toward the outermost track in the lower inner area 9 of the optical disk 1.

The Lo head 14 records and reproduces in the sequence of Zo15 to Zo14 to Zo13 ... to Zo0 from the innermost track toward the outermost track in the lower outer area 10 of the optical disk 1.

The Ui head 15 records and reproduces in the sequence of Zi15 to Zi14 to Zi13 ... to Zi0 from the outermost track toward the innermost track in the upper inner area 11 of the optical disk 1.

By moving the four optical heads in this way, the distance of the converged light spots by the four heads tracing the tracks in a unit time, that is, the sum of the linear velocities of the four optical heads is always nearly constant.

FIGS. 3a to 3d show signal formats on sectors of the optical disk 1 in an embodiment of the invention. FIG. 3a shows a signal format on a sector in the upper outer area, FIG. 3b shows a signal format on a sector in the lower inner area, FIG. 3c shows a signal format on a sector in the lower outer area, and FIG. 3d shows a signal format on a sector in the upper inner area. On each sector, sequentially from the beginning thereof, the address area ADR, four audio signal recording areas A1, A2, A3 and A4, and one video signal recording area Va, Vb, Vc or Vd are disposed with respective gap areas G1 interposed therebetween. In the last space of each sector, a gap area G2 is provided.

In the address area ADR, as mentioned before, the address information such as a track number and a sector number has been preformatted in the form of, for example, undulations of grooves, which is used for recognizing the position of each optical head. The recording and reproducing method of the address information is arbitrary, but it is preferable to record and reproduce by the CAV method in order to enhance the reliability and high speed retrieval. This is because it is not necessary to vary the clock frequency for reproduction zone by zone in the CAV method. Therefore, the reproduction frequency of the address information is always constant regardless of the zone, and the optical disk 1 is rotated at a constant angular velocity, so that the length of the address area ADR becomes longer as becoming closer to the outer circumference in proportion to the radius of the track.

The audio signal recording areas A1, A2, A3 and A4 are recording areas of four audio channels 1, 2, 3 and 4. The audio signals of four channels occurring in a specific period of time are each divided into four blocks to be recorded in the upper outer area, upper inner area, lower inner area, and lower outer area. Va, Vb, Vc, and Vd are video signal recording areas of respective sectors, and a video signal in a specific period of time is converted into digital data and divided into four blocks to be recorded in the four areas Va, Vb, Vc and Vd.

A first reason for providing the gap area G1 is to prevent erroneous recording in the adjacent recording area during the post-scoring or pre-scoring of audio signal or video signal due to eccentricity of the optical disk 1 or variation of the rotation speed of the spindle motor 7. A second reason is to use the time for crossing the gap area for controlling the power of the semiconductor laser built in the optical head. Because of these two reasons, the length of the gap area G1 is required to be long enough to satisfy the following two conditions:

1. Long enough to absorb the eccentricity of the optical disk 1 or rotation speed variations of the spindle motor 7.
2. Long enough to change the power of the semiconductor laser from a reproduction power to a recording power, or from the recording power to the reproduction power.

Accordingly, the length of the gap area G1 may be determined by a time length $t_{G1}$ for satisfying the conditions 1 and 2 rather than by the physical length.

The gap area G2 is provided for preventing destruction of the address area ADR of the next sector when recording due to eccentricity of the optical disk 1 or rotation speed variations of the spindle motor 7. Therefore, the length of the gap area G2 may be also determined by a time length $t_{G2}$.

In each one of the video signal recording areas Va, Vb, Vc, Vd and audio signal recording regions A1, A2, A3, A4, a preamble (Pre) is added at the beginning and a postamble (Pos) is added at the end, and also a sync signal is recorded in order to reproduce correctly the recorded audio signal and video signal. Each of the audio signal and video signal is recorded in the form of a sync block as shown in FIG. 3e. In this embodiment, each sync block is composed of 97 bytes. A sync signal SYNC (2 bytes) showing the beginning of the sync block is used for synchronism detection of the block when reproducing. An identification data ID (2 bytes) is used for distinguishing the kind of the data in the sync block. The audio or video data (DATA) is 85 bytes, and a PARITY of 8 bytes for error correction is attached at the end of the sync block.

Described next is the method for determining the length of each area in the sector and the recording frequency of each zone. In the optical disk 1, the sector length becomes longer as becoming closer to the outer circumference. The physical length of the address area ADR is longer at area closer to the outer circumference because of the reproduction by the CAV method as mentioned before. Supposing to reproduce the address information of a specific number of bits, the length of the address area ADR is required to have a specific time length $t_{ADR}$. The gap areas G1, G2 have the time lengths $t_{G1}$, $t_{G2}$ as mentioned before. However, of the length of the entire sector, the rate of the address area ADR and gap areas G1, G2 is small, and hence the physical length of the audio signal recording area and video signal recording area is also long.

Supposing the rotating speed of the optical disk 1 to be R, the time length $t_S$ of each sector is $$t_S = 1/(R \times 6) \tag{1}$$

because one track has six sectors, and hence $t_S$ and R are constant. Supposing the recording frequency to be $f_{REC}$, the total number of channel bits $b_S$ that can be recorded in the audio signal recording area and video signal recording area in one sector is $$b_S = f_{REC} \times (t_S - t_{ADR} - 5 \times t_{G1} - t_{G2}) \tag{2}$$

where $t_S$, $t_{ADR}$, and $t_{G1}$ are constant. In the MCAV method, the recording frequency $f_{REC}$ is varied zone by zone so that the linear recording density (physical length per bit) in the track direction may be nearly constant. Therefore, by increasing $f_{REC}$ in the outer zones, $b_S$ becomes larger in the outer zones.

In this embodiment, the number of channel bits $b_A$ to be recorded in the audio signal recording area in one sector is set constant regardless of the zones, and the number of channel bits $b_v$ to be recorded in the video signal recording area is set larger in the outer zones. That is, $$b_v = f_{REC} \times (t_S - t_{ADR} - 5 \times t_{G1} - t_{G2}) - b_A \tag{3}$$

where $t_S$, $t_{ADR}$, $t_{G1}$, $b_A$ are constant.

As mentioned above the audio signals and video signals are recorded in a sync block unit of 97 bytes. Accordingly, $b_A$ and by are discrete values (multiples of 97). By contrast, $f_{REC}$ must be set at a delicate value in order to keep the linear recording density substantially constant in all zones. Therefore, in order to satisfy formula (3), fine adjustment is made by changing $t_{G2}$. As explained herein, the method of determining the length of each recording area in the sector in each zone may be attributed to the method of distribution of video blocks.

FIG. 4 is a table showing the radius of the innermost circumference and outermost circumference in each zone, the recording frequency, and the number of video sync blocks in a sector of the optical disk 1 of the embodiment. In this embodiment, in one track of the optical disk 1, video signals and audio signals of two fields (60 fields per second) are recorded. One track has six sectors, and the data of one field is recorded as being divided into a total of 3×4=12 sectors, by every three sectors in each optical head. The outer diameter of the optical disk 1 is 30 cm, the inner diameter of the innermost circumference is 44 mm, the radius of the outermost circumference is 140 mm, and the total number of blocks in a field is 2448 blocks of video signal and 48×4 channels=192 blocks of audio signal. Therefore, the total number of blocks recorded in one sector is, in a total of the four optical heads, 2448/3 sectors=816 blocks of video signal, and 192/3 sectors=64 blocks of audio signal.

The number of bits to be recorded in the audio signal recording area in one sector is the same in all zones as mentioned above. Therefore, the number of audio blocks in a sector is 64/4=16 blocks, or 4 blocks per channel. In this embodiment, the number of audio blocks is set the same in all zones, but it may be different. Supposing the number of audio blocks in a sector in a zone ZiX (X=0, 1, 2, . . . ,15) of the inner area to be A1X (AiX is a natural number), and the number of audio blocks in a sector in a zone ZoX of the outer area 6 to be AoX (AoX is a natural number), the relation of AiX+AoX=A (constant) may be established. In this embodiment, which records by using four (two pairs of) optical heads, the total number of blocks in one audio channel to be recorded in one sector is 2A. That is, A=64/2=32 (pieces).

The number of video blocks in one sector is 816 blocks, which are distributed so as to satisfy formula (3). The combination of the zones to be distributed conforms to the combination of one lateral row in FIG. 5. That is, supposing the number of video blocks in a sector in a zone ZiX in the inner area 5 to be BiX (B1X is a natural number), and the number of video blocks in a sector in a zone ZoX in the outer circumference to be BoX (BoX is a natural number), blocks are distributed so as to establish the relation of BiX+BoX=B (constant). In this embodiment, which records by using four (two pairs of) optical heads, the total number of blocks of video signal recorded in one sector is 2B. That is B=816/2=408 (pieces).

By such signal format, the video signal and the audio signals of four channels can be recorded by dispersing into the inner area and outer area. By recording the video signal and the audio signals of four channels by time sharing in respective areas, post-scoring or pre-scoring is enabled. When reproducing, video signals, or audio signals of arbitrary channel, or the plural combinations may be selected and reproduced easily.

Herein, "post-scoring" is to record a video signal or audio signal, an audio signal of an arbitrary channel if audio signals are recorded in plural channels, a video signal of an arbitrary channel if video signals are recorded in plural channels, or the plural combinations, preliminary in a specified recording area, and then record an audio signal or video signal in other area. "Pre-scoring" is to record an audio signal or video signal preliminary in a different area, before recording a video signal of an arbitrary channel, or an audio signal of an arbitrary channel, or the plural combinations in a specific recording area.

In this embodiment, audio signals are recorded in four channels, and video signals in one channel, but regardless of the number of channels for both audio and video signals, the obtained effects are the same as far as each channel is dispersed into the inner area and outer area. The configuration of the recording areas in the sector is not required to be in the sequence of the plural audio signal recording areas and video signal recording areas. When the address area is set at the beginning of the sector or track, the obtained effects are the same regardless of the sequence. In order to add sync signals to the audio signal recording area and video signal recording area, a preamble is provided at the beginning of each area, and a postamble is provided at the end, but the method of adding the sync signal is not limited to this alone. The same effects are obtained when each area is divided into plural blocks, and a sync signal is added to the beginning of each of the plural blocks. FIGS. 22a to 22d show examples of signal formats on sectors in the case of recording two channels of audio signals and two channels of video signals. In the diagrams, video signal recording areas V1a, V1b, V1c, V1d are recording areas corresponding to channel 1 of video signal, and video signal recording areas V2a, V2b, V2c, V2d are recording areas corresponding to channel 2 of video signal. As clear from comparison with FIGS. 3a to 3d, although the configuration sequence of the audio signal recording areas and video signal recording areas is different, the obtained effects are the same.

The audio signal recording area or video signal recording area in a sector may be provided in a plurality of areas per channel. By providing D audio signal recording areas in one sector, audio signals of M channels may be recorded by corresponding to any M areas of the D audio signal recording areas. Herein, D and M are natural numbers, and the relation of $D \geq M$ is established. By providing E video signal recording areas in one sector, video signals of N channels may be recorded by corresponding to any N areas of the E video signal recording areas. Herein, E and N are natural numbers, and the relation of $E \geq N$ is established. FIGS. 3A to 3d are examples of D=M=4, E=N=1, and FIGS. 22a to 22d are examples of D=M=2, E=N=2. As shown in both examples, it is desired that the configuratlon of audio channels and configuration of video channels in the sector be all the same. As a result, it is not necessary to change the configuration sequence of channels In each sector, and control of the recording apparatus and reproducing apparatus is easy.

To the contrary, it is not necessary to provide audio signal recording areas or video signal recording areas corresponding to all channels to be recorded in all sectors. FIGS. 23a to 23d are other examples of signal formats on the sectors for recording four channels of audio signals (M=4) and one channel of video signal (N=1). In this case, audio signal recording areas A1 and A2 corresponding to audio channels 1 and 2 are disposed only in the sectors of the upper outer area and upper inner area, and audio signal recording areas A3 and A4 corresponding to audio channels 3 and 4 are disposed only in the sectors of the lower inner area and lower outer area. In this signal format example, too, the principle of recording the audio signals of all channels by dispersing into the inner area and outer area is maintained. However, the number (D) of audio signal recording areas per sector is four in the examples in FIGS. 3a to 3d, and is two in the examples in FIGS. 23a to 23d. The number of gap areas G1 provided between the recording areas is decreased from five to three. Therefore, the rate of occupation of the gap areas in one sector can be decreased by the portion corresponding to the decreased number of gap areas G1, so that the optical disk can be utilized more effectively.

Figure 6:
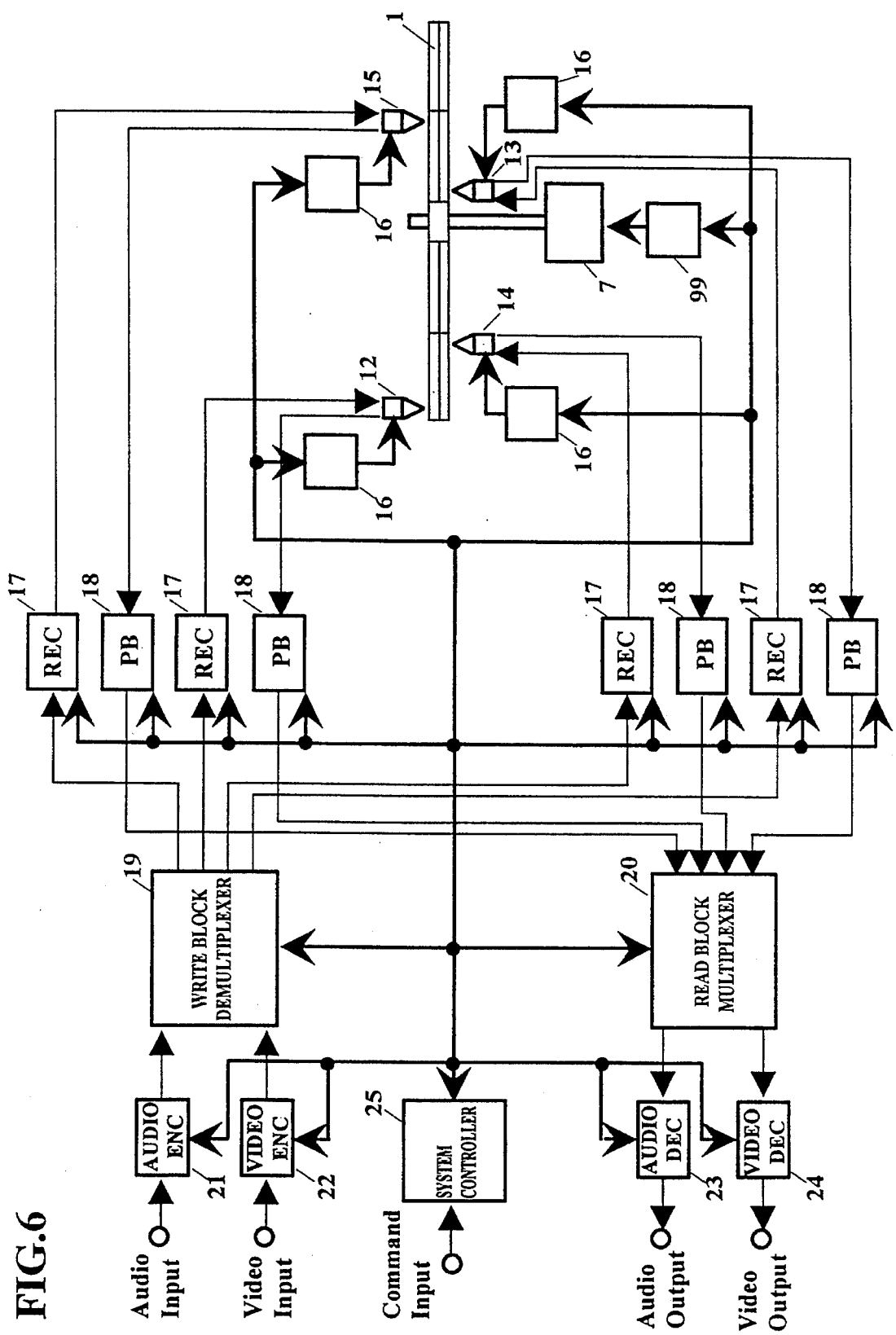
FIG. 6 Is a structural diagram of an optical recording and reproducing apparatus in an embodiment of the invention.

FIG. 6 is a structural diagram of an optical recording and reproducing apparatus in an embodiment of the invention.

In the optical disk 1, as mentioned above, tracks are provided on both sides, and one track is divided into six sectors at every 60 degrees. The disk measures 30 cm in outer diameter, and is divided into a total of 32 zones in the radial direction, consisting of 16 zones in the inner area, and 16 zones in the outer area.

The optical disk 1 is rotated at a constant speed of 1800 rpm by the spindle motor 7. A motor controller 99 controls the rotation of the spindle motor 7 so as to rotate at a constant angular velocity by the known art.

There are four optical heads, consisting of, as mentioned above, an Uo head 12 for accessing the tracks in the upper outer area of the disk 1, an Li head 13 for accessing the tracks in the lower inner area, an Lo head 14 for accessing the tracks in the lower outer area, and an Ui head 15 for accessing the tracks In the upper inner area. The method of accessing each zone confirms to the combinations of the table in FIG. 5 as mentioned above.

In the optical heads 12, 13, 14 and 15, corresponding head controllers 16 are connected and in order to move the converging light spot from the optical heads to a desired track, focus control, tracking control, and transfer control of optical heads are effected by the known art.

In order that each optical head may record or reproduce in a desired track of the optical disk 1, first focus control and tracking control are effected, then the address information of the address area provided at the beginning of each sector of the optical disk 1 is reproduced, and then the position of the optical head is recognized. The address information is reproduced by the address information reproducing circuit built in a reproduction demodulation circuit (PB) 18. A system controller 25 controls the head controller 16 by making use of the continuity of address information on the basis of the reproduced address information, and seek to a desired track, or a track jump action is repeated.

The signal flow in recording is described below.

An input audio signal and an input video signal are digitized respectively in an audio encoder 21 and a video encoder 22, and the encoded audio data and video data are sent to a write block demultiplexer 19. In the write block demultiplexer 19, sync blocks of audio data and video data are sent out into four modulation recording circuits (REC) 17 at different distribution ratios zone by zone. The output sequence conforms to the signal format in the sector shown in FIG. 3. In each modulation recording circuit 17, the digital data produced according to the signal format in the sector is modulated by using a known recording modulation code, and using a recording clock having a frequency dependent on the zone, a pulse signal for driving a semiconductor laser built in a corresponding head (12, 13, 14, or 15) connected in the modulation recording circuit is issued.

In each of the optical heads, Uo head 12, Li head 13, Lo head 14 and Ui head 15, although not shown in the drawings, the built-in semiconductor laser is driven according to the recording signal, and the signal is recorded in each area of the optical disk 1.

The signal flow in reproduction is explained next.

The reproduced signal from the optical disk 1 through each optical head is amplified in a corresponding reproduction demodulation circuit 18 connected to the optical head, separated into the address information and other signals, and demodulated by the known art. The demodulated binary data is issued to a read block multiplexer 20. In the read block multiplexer 20, demodulated data from four reproduction demodulation circuits 18 are taken in a specified sequence, and the block synchronism (SYNC) and identification signal (ID) of each sync block are detected. Further, the demodulated data is divided into audio block and video block, and the audio block is issued to an audio decoder 23 and the video block to a video decoder 24. The audio decoder 23 decodes the audio block to obtain an audio signal. The video decoder 24 decodes the video block to obtain a video signal.

Each circuit block shown in FIG. 6 operates under the control of a system controller 25. The system controller 25 receives a command input from outside, and controls each circuit block so as to record or reproduce correctly.

Regarding a principal circuit block that features an embodiment of the invention, its internal constitution is described below. The circuit blocks shown in FIG. 6 but are not described below are known circuits or combinations of known circuits, and hence detailed descriptions are omitted.

Figure 7:
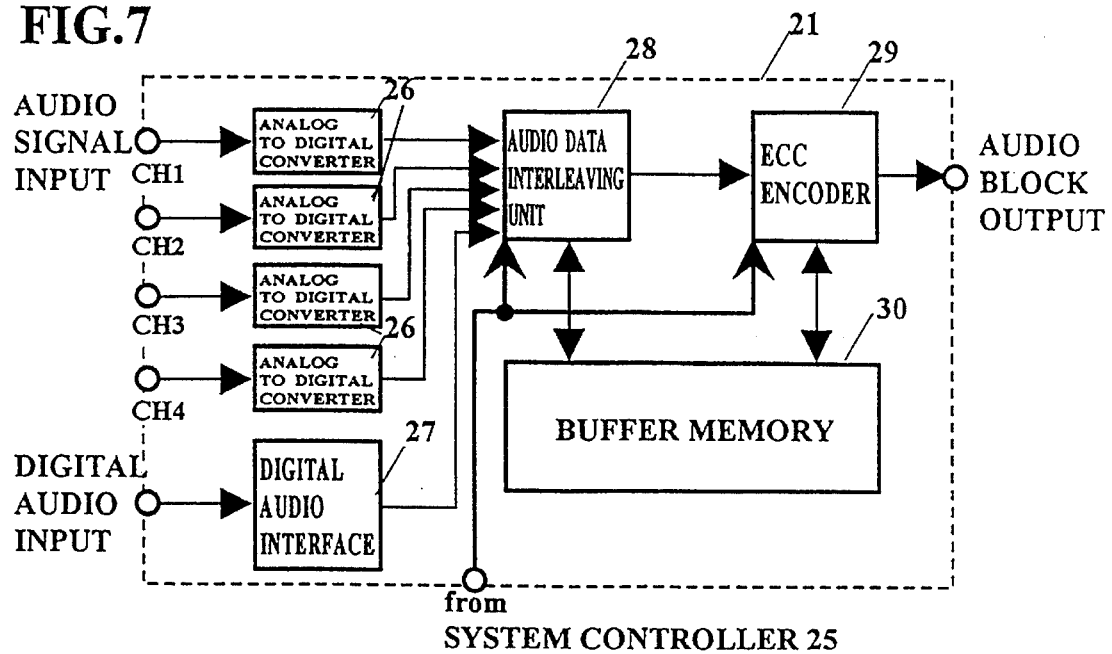
FIG. 7 is a diagram showing an example of internal constitution of an audio encoding circuit in an embodiment of the invention.

FIG. 7 is a block diagram showing an example of internal constitution of the audio encoder 21 in FIG. 6. The audio encoder 21 is a circuit block for converting the input audio signal into digital data on a block by block basis. The input audio signal may be either an analog signal or an encoded digital data. When an analog audio signal is entered, it is first converted into a digital signal in every channel by an analog to digital (A/D) converter 26, and is put into an audio data interleaving unit 28. When an encoded digital audio signal is entered, it is directly fed into the audio data interleaving unit 28 through a digital audio interface 27. The audio data interleaving unit 28 reshuffles the data sequence in order to lessen the effects of the burst error. In this embodiment, the audio signal in a specific period of time is once written into a buffer memory 30, and read out from the buffer memory 30 by reshuffling the sequence according to a specific rule, thereby composing data of each block according to the read-out sequence. This process is called the interleaving process for exchanging the data sequence according to a specific rule. Contrary to the interleaving process, when reproducing, the reproduced data is written into a memory, and read out of the memory in the sequence of recovering to the original, so that the audio signal and video signal conforming to the original time sequence are obtained. This process is called reinterleaving process. The interleaved audio data is put in an ECC (error correction code) encoder 29, in which a known error correction code is added, and the data is put out in a block of 93 bytes. By interleaving processing, in the range of the specific period of time determined initially, the data can be arranged on the recording format regardless of the time axis or position of the video signal on the screen. Besides, by disposing an area for writing redundant data for error correction on the buffer memory 30, or by adding an error correction code generated according to a certain generation rule, and interleaving, if continuous errors occur on the recording format, errors can be dispersed by the re-interleaving process when reproducing, thereby minimizing the effects on burst error and random error.

Figure 8:
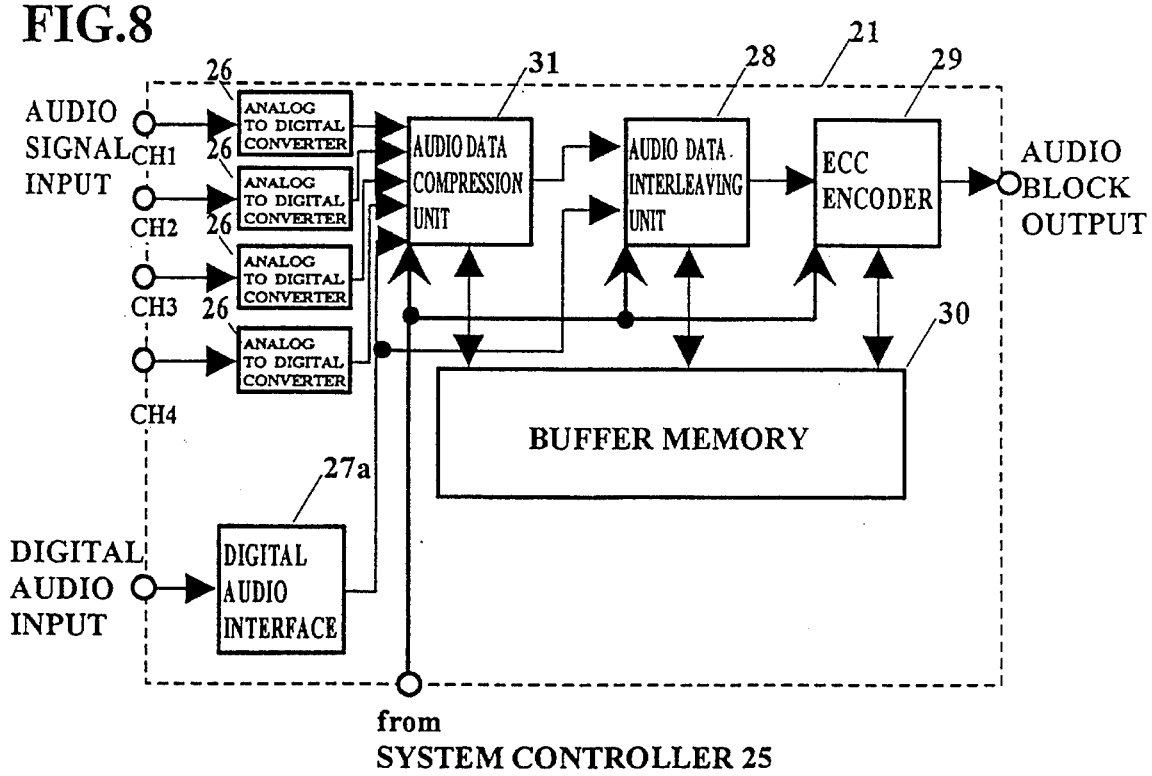
FIG. 8 is a diagram showing another example of internal constitution of an audio encoding circuit in an embodiment of the invention.

FIG. 8 is a block diagram showing another example of the audio encoder in FIG. 6. In this example, the audio signal is compressed into a compressed digital signal before error correction encoding. An audio data compression unit 31 compresses the A/D converted audio signal into a compressed digital signal by the known art. A digital audio interface 27a can handle both the compressed audio data and non-compressed audio data, and the digital input audio data is selectively issued to either audio data compression unit 31 or audio data interleaving unit 28 depending on presence or absence of compression. In this example by compressing the audio data, the bit rate of audio data can be lowered.

Figure 9:
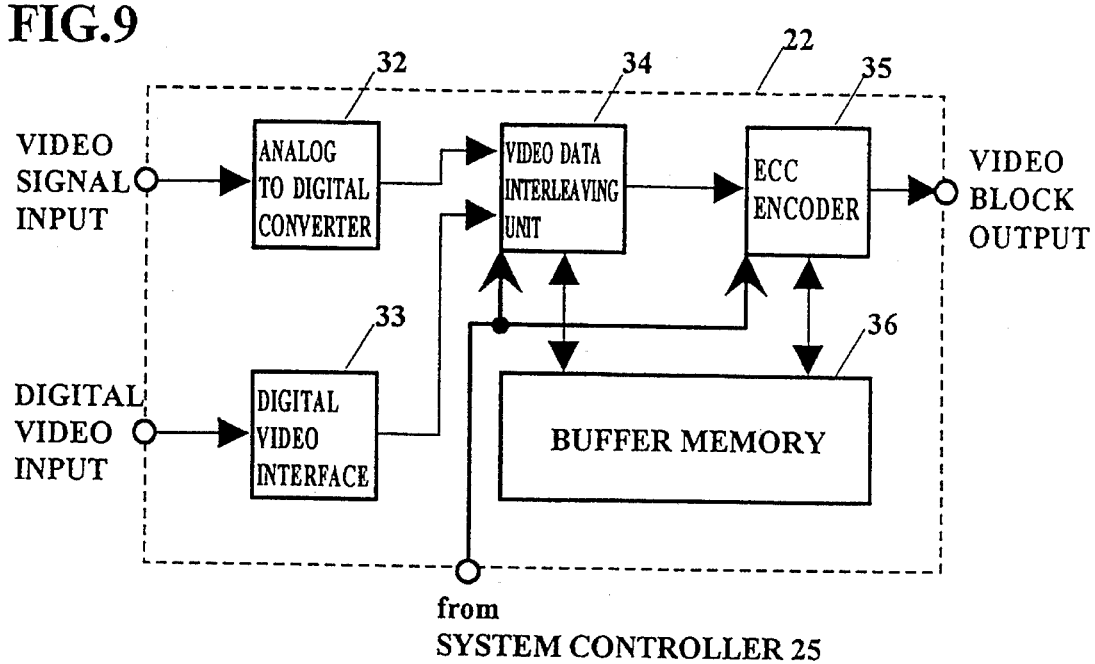
FIG. 9 is a diagram showing an example of internal constitution of a video encoding circuit in an embodiment of the invention.

FIG. 9 is a block diagram showing an example of internal constitution of the video encoder 22 in FIG. 6. The video encoder 22 is a circuit block for converting the input video signal into a digital data of block unit as mentioned above. The input video signal may be either an analog signal or an encoded digital data. If an analog video signal is entered, it is first converted into a digital signal in an A/D converter 32 and is fed into a video data interleaving unit 34. If an encoded digital video signal is entered, it is directly fed into the video data interleaving unit 34 through a digital video interface 33. The video data interleaving unit 34 reshuffles the data in order to lessen the effects of burst error. The interleaved video data is fed into an ECC encoder 35, in which a known error correction code is added and it is produced in a block of 93 bytes in the same way as in the case of audio signal. The interleaving process and error correction encoding can be effected by writing the video data once in a buffer memory 35.

Figure 10:
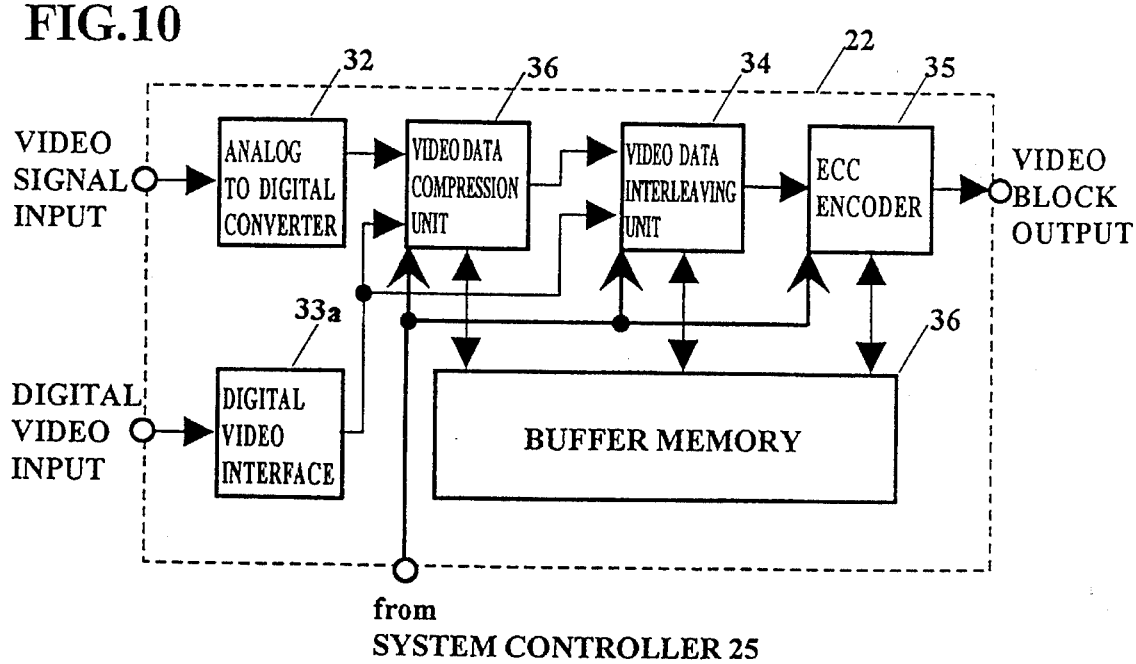
FIG. 10 is a diagram showing another example of internal constitution of a video encoding circuit in an embodiment of the invention.

FIG. 10 is a block diagram showing another example of the video encoder in FIG. 6. In this example, the video signal is compressed into a compressed digital signal before error correction encoding. A video data compression unit 36 compresses the A/D converted video signal into a compressed digital signal by the known art. The digital video interface 33a can handle both the compressed video data and non-compressed video data, and the digital input video data is selectively sent to either the video data compressing unit 36 or video data interleaving unit 34 depending on presence or absence of compression. In this example, by compressing the video data, the bit rate of the video data can be lowered.

Figure 20:
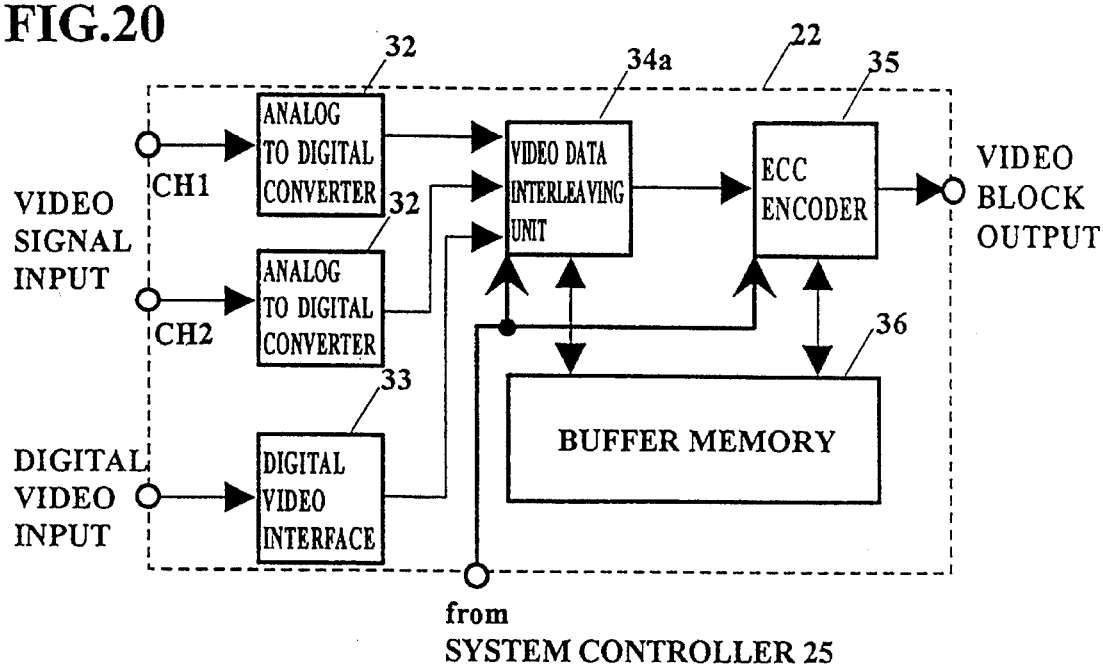
FIG. 20 is a diagram showing another example of internal constitution of a video encoding circuit in an embodiment of the invention.

FIG. 20 shows another example of internal constitution of the video encoder 22 in FIG. 6. In the example in FIG. 20, the video signal is entered in two channels. Just like the audio data interleaving unit 28 in the audio encoder 21 shown in FIG. 7 processing the audio signals of four channels together, the video data interleaving unit 34a processes the video data of two channels together. When using the video encoder 22 having such internal constitution, it is possible to record video signals of two channels in the optical disk having the format as shown in FIGS. 23a to 23d.

Figure 11:
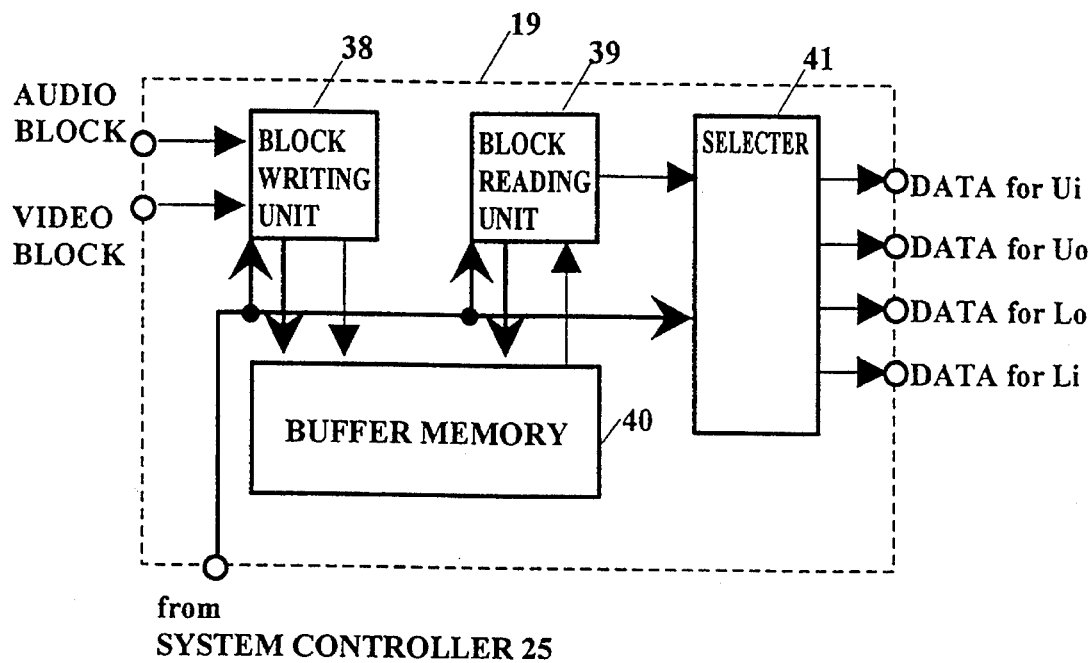
FIG. 11 is a diagram showing an example of internal constitution of a write block demultiplexer In an embodiment of the invention.

FIG. 11 is a block diagram showing an example of internal constitution of the write block demultiplexer 19 in FIG. 6. The write block demultiplexer 19 is a circuit block which forms the audio data and video data entered on a block by block basis into sync blocks as mentioned above, and distributes and sends into four demodulation recording circuits 17 in the sequence conforming to the signal format in the sector. The audio data and video data entered on a block by block basis are once written into a buffer memory 40. The write address into the buffer memory 40 is generated in a block writing unit 38. The buffer memory 40 is constituted to write data of 95 bytes continuously, and the audio block and video block entered in 93-byte unit are written, while two-byte block Identification (ID) signal is written at the same time. The block identification (ID) signal comprises a video or audio field number, block number showing a sequence of sync blocks, a flag to distinguish video block or audio block, and others, and is used to Judge which block the data belongs to when reproducing. Each block data written in the buffer memory 40 is read out in the sequence conforming to the signal format shown in FIG. 3. A block reading circuit 39 generates a read address of the buffer memory, and adds a sync signal of two bytes to the beginning of the block data in the 95-byte unit to compose a sync block of 97-byte unit. The sync signal is used for detecting synchronism in every sync block. A selector 41 selectively issues each sync block in 97-byte unit into any one of the four modulation recording circuits 17. At this time, simultaneously, other recording data shown in FIG. 3, for example, preamble (Pre) and postamble (Pos) are inserted into specified positions. Meanwhile, as mentioned above, since the signal format in the sector varies zone by zone, the distribution method of block data also varies zone by zone. In this embodiment, the system controller 25 gives the zone number to the block reading circuit 39 and selector 41, and changes over the block reading sequence or block distribution method zone by zone so as to be applicable to different signal formats in different zones.

Figure 12:
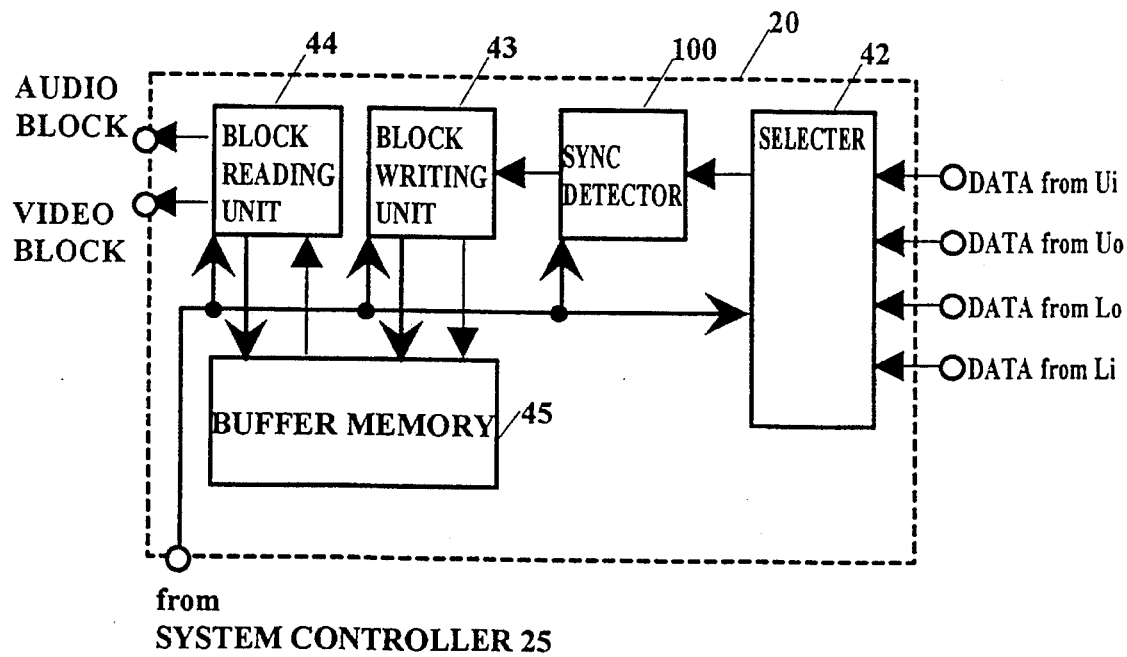
FIG. 12 is a diagram showing an example of internal constitution of a read block multiplexer in an embodiment of the invention.

FIG. 12 is a block diagram showing an example of internal constitution of the read block multiplexer 20 in FIG. 6. The read block multiplexer 20 is, as mentioned above, a circuit block for processing together the reproduced data demodulated in the four reproduction demodulation circuits 18, and outputting by dividing Into the audio block and video block. The data from the four reproduction demodulation circuits are put into a selector 42. The selector 42 detects the block synchronism of the input data, and produces a series of data of sync blocks. A block writing unit 43 judges a block identification signal (ID) of two bytes out of the series of sync block data, generates a write address, and writes the reproduced data on a block by block basis into a buffer memory 45. The buffer memory 45 is constituted to write in and read out data on a block by block basis and the block writing unit 43 generates a write address on the basis of the information obtained by judging the block identification signal. The block data thus written into the buffer memory 45 is read by a block reading unit 44. The block reading unit 44 generates a read address of the buffer memory, and produces the read block data by dividing into audio block and video block. The sequence of the reproduced data differs with the reproduced zone this embodiment, on the basis of the address information reproduced by the reproduction demodulation circuit 18, the system controller 25 judges the presently reproduced zone, and transfers the zone number to each circuit block in the read block multiplexer 20, thereby realizing data processing differing zone by zone. Meanwhile, the transfer of reproduced zone number may not be necessarily done through the system controller 25 as in this embodiment. For example, the address information reproduced by the reproduction demodulation circuit 18 is transferred directly to the selector 42 or block writing unit 43, and the selector 42 or the block writing unit 43 may judge the reproduced zone number depending on the address information.

Figure 13:
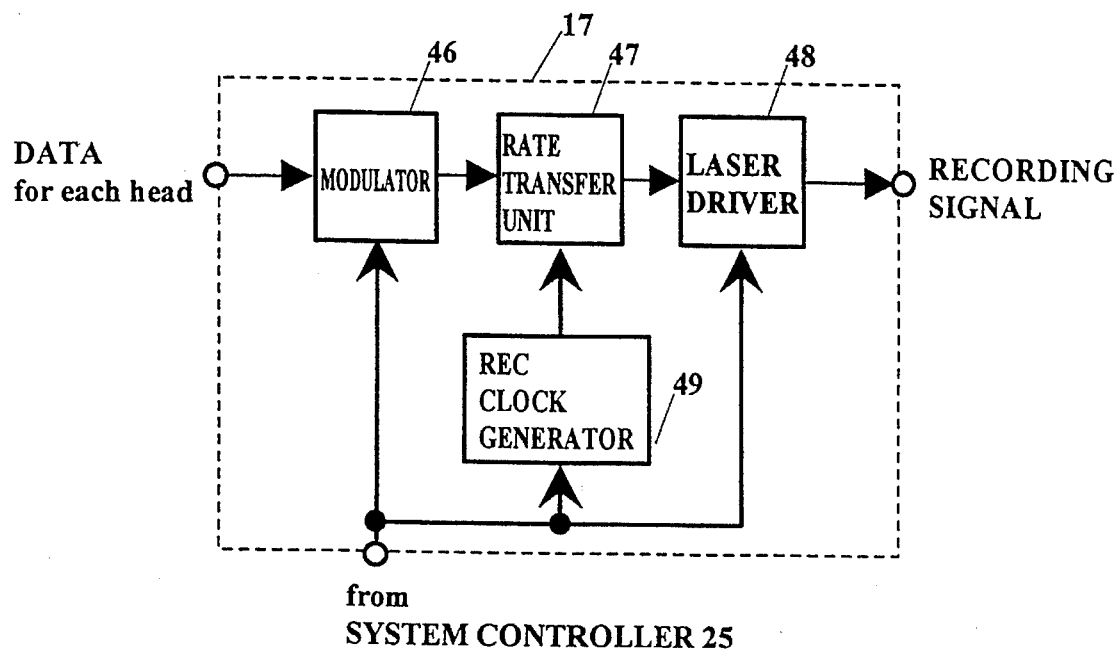
FIG. 13 is a diagram showing an example of internal constitution of a modulating and recording circuit for each optical head in an embodiment of the invention.

FIG. 13 is a block diagram showing an example of internal constitution of the modulation recording circuit 17 in FIG. 6. The modulation recording circuit 17 is a circuit block for, as mentioned above, modulating recorded data, generating a recording clock signal whose frequency varies zone by zone, and producing the recording signal as a pulse signal for driving the semiconductor laser. The recording data (binary data) divided into each optical head by the write block demultiplexer 19 is first put into a modulator 46. The modulator 46 modulates the binary data by using known recording modulation code, and the modulated data is sent out into a rate transfer unit 47. At the same time, the recording clock signal whose frequency varies zone by zone (for example, the frequency shown in FIG. 4) is generated in a record clock generator 49. The record clock generator 49 is composed of a frequency synthesizer making use of, for example, a PLL, and generates a recording clock signal whose frequency is controlled by changing over the dividing/multiplying ratio of a reference clock signal according to the zone number entered from the system controller 25. The rate transfer unit 47 is a circuit block for converting the modulation data of modulated specific rate into a data having a rate of the recording clock signal generated in the clock generator 49, and It is composed of, for example, a FIFO memory, a shift register, etc. The modulation data converted to have a rate dependent on the zone is entered to a laser driver 48. The laser driver 48 converts the modulation data into a pulse signal for driving the semiconductor laser.

Figure 14:
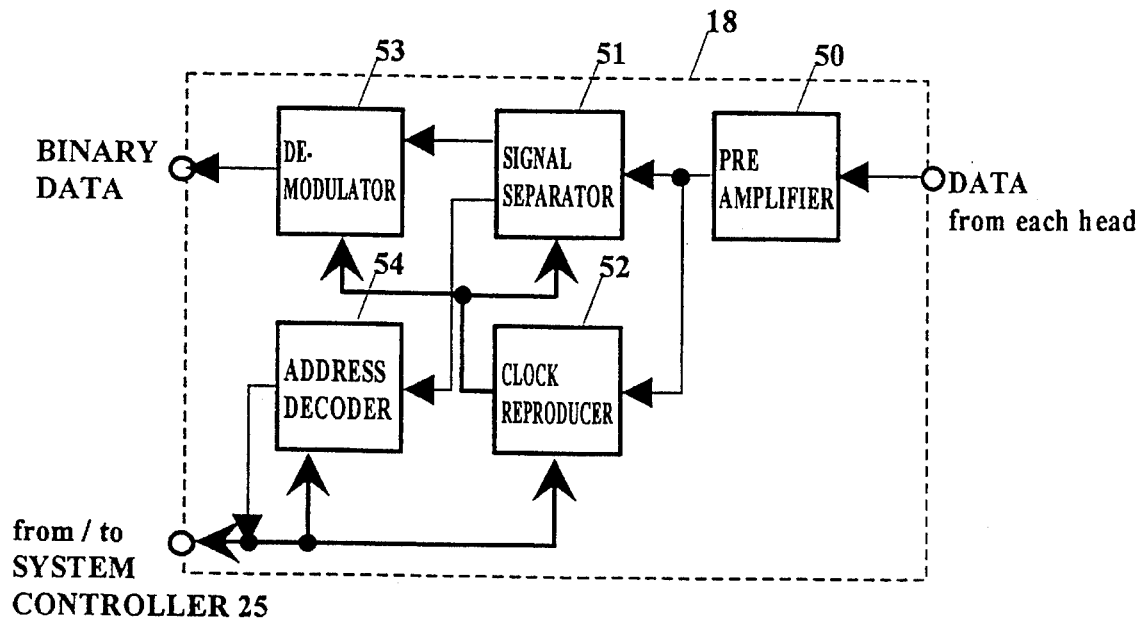
FIG. 14 is a diagram showing an example of internal constitution of a reproducing and demodulating circuit for each optical head in an embodiment of the invention.

FIG. 14 is a block diagram showing an example of internal constitution of the reproduction demodulation circuit 18 in FIG. 6. The reproduction demodulation circuit 18 is a circuit block for, as mentioned above, amplifying the reproduced signal being read through each optical head, reading the address information, demodulating the reproduced signal, and issuing the reproduced data (binary data). First, the reproduced signal read by each optical head is put into a preamplifier 50. The preamplifier 50 amplifies the input reproduced signal, and sends out the amplified signal into a signal separator 51 and a clock reproducer 52. The signal separator 51 transforms the reproduced signal into binary data, and the binary reproduced data is separated into data including address information, and data including recording signal. Of the separated reproduced data, the address information is sent to an address decoder 54, and the recorded audio or video data is sent to a demodulator 53. The clock reproducer 52 reproduces a clock for latching the reproduced data on the basis of the reproduced signal. The demodulator 53 demodulates the reproduced data by using a clock signal reproduced by the clock reproducer 52, and issues binary data. The address decoder 54 decodes the address information from the reproduced data, and issues the decoded address information Into the system controller 25. The address decoder 54 is always working whether the apparatus is in recording state or reproducing state, and the decoded address information is used for positioning each optical head on the desired track on the optical disk 1.

Figure 15:
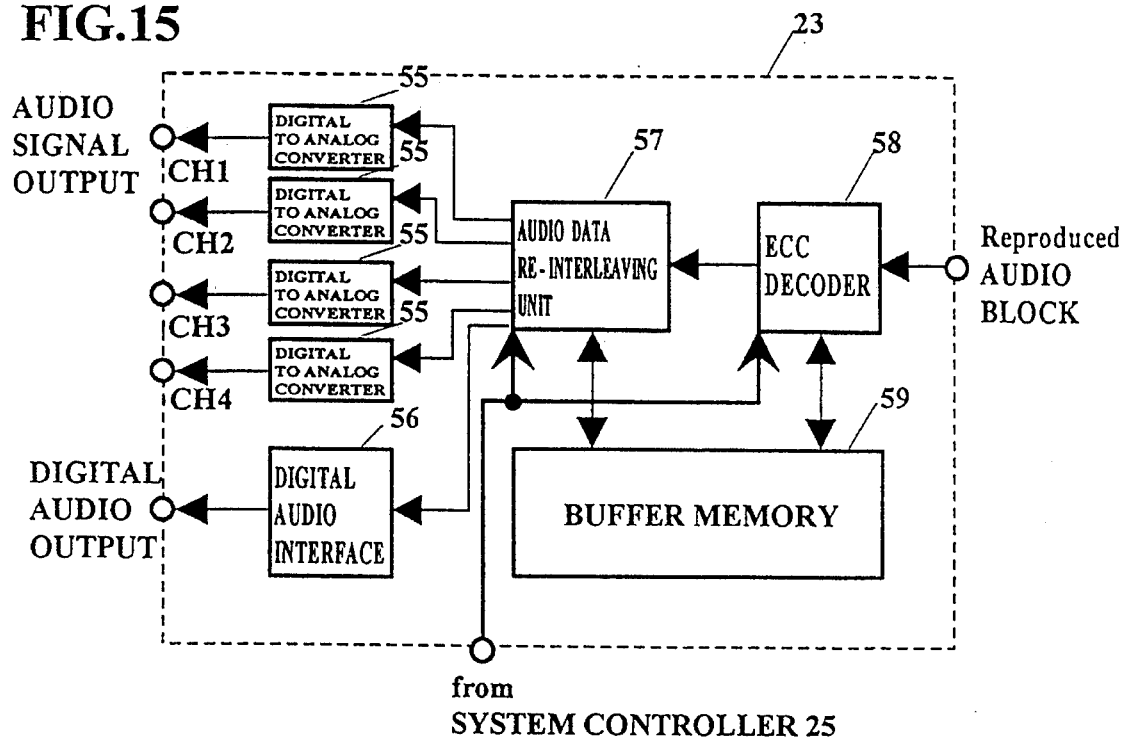
FIG. 15 is a diagram showing an example of internal constitution of an audio decoding circuit in an embodiment of the invention.
Figure 16:
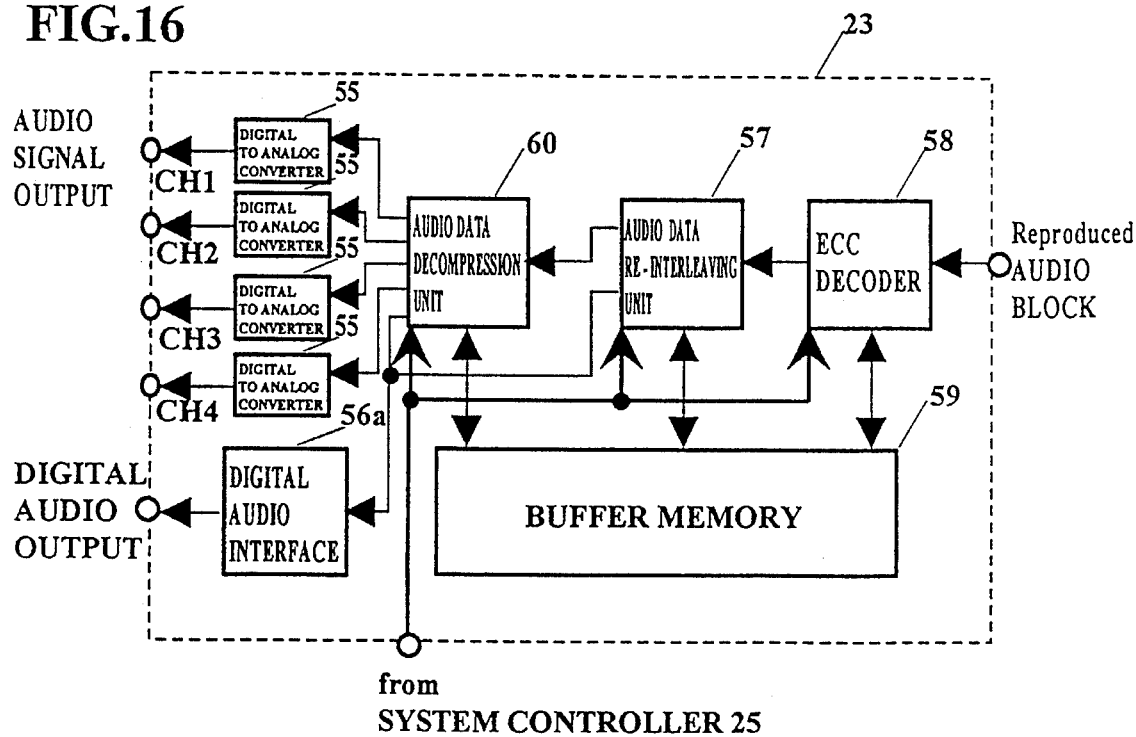
FIG. 16 is a diagram showing another example of internal constitution of an audio decoding circuit in an embodiment of the invention.

FIG. 15 and FIG. 16 are block diagrams showing examples of internal constitution of the audio decoder 23 in FIG. 6. The audio decoder 23 pairs with the audio encoder 21, and it is a circuit block for obtaining an audio signal by performing exactly reverse process to the audio encoder 21 at the time of reproduction. The internal constitution shown in FIG. 15 is an example of using the internal constitution shown in FIG. 7 as the audio encoder 21. Through a buffer memory 59, error correction processing of audio data divided into blocks is effected in an ECC decoder 58. Furthermore, to return the data finishing the correction process back to the time sequence, the data sequence is reshuffled again in an audio data re-interleaving unit 57 (re-interleaving process). The digital audio data returning to the original time sequence is converted from digital to analog in a D/A converter 55, and issued as analog audio signal. Or it is issued directly as digital signal by a digital audio interface 56.

The internal constitution shown in FIG. 16 is an example of using the internal constitution shown in FIG. 8 as the audio encoder 21. What differs from the example in FIG. 7 is that the audio data is compressed at the time of recording, so that an audio data decompression unit 60 is attached for expanding process as its reverse processing.

Figure 17:
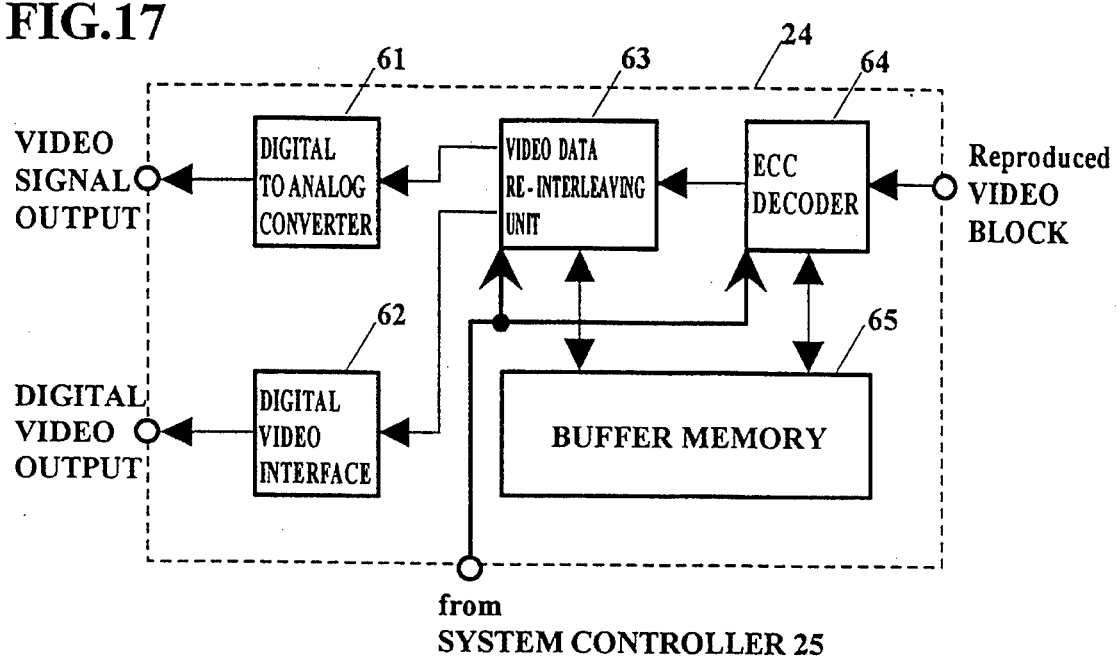
FIG. 17 is a diagram showing an example of internal constitution of a video decoding circuit in an embodiment of the invention.
Figure 18:
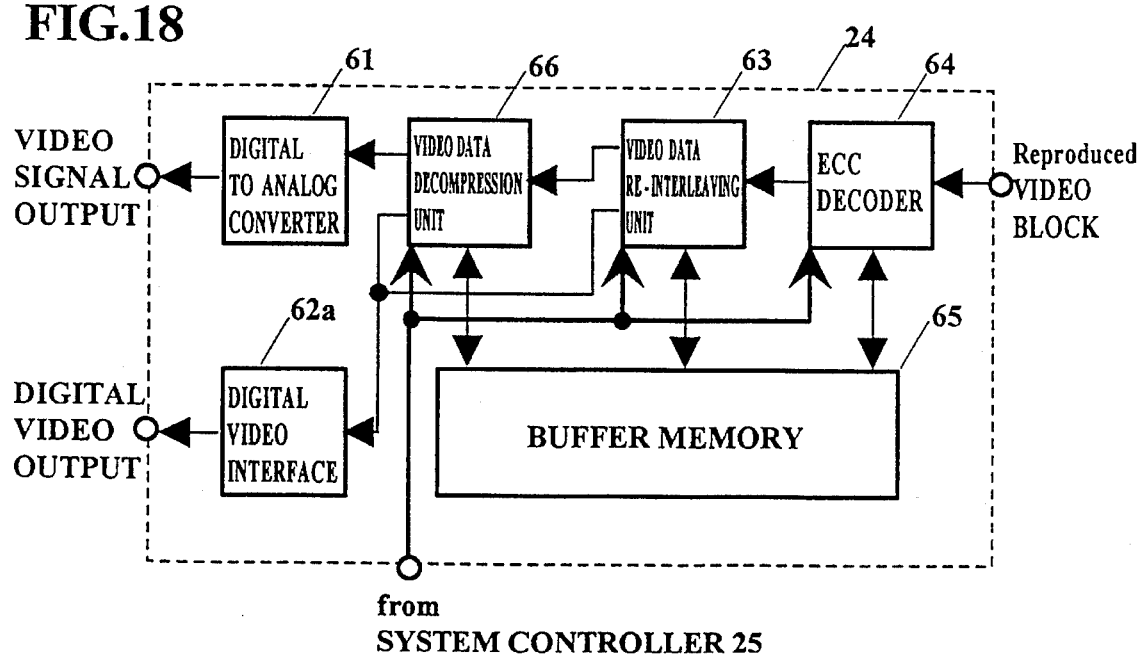
FIG. 18 is a diagram showing another example of internal constitution of a video decoding circuit in an embodiment of the invention.

FIG. 17 and FIG. 18 are block diagrams showing examples of internal constitution of video decoder 24 in FIG. 6. The video decoder 24 pairs with the video encoder 22, and is a circuit block for obtaining a video signal by performing exactly reverse process to the video encoder 22 at the time of reproduction. The internal constitution shown in FIG. 17 is an example of using the internal constitution shown in FIG. 9 as the video encoder 22, and the internal constitution shown in FIG. 18 is an example of using the internal constitution shown in FIG. 10 as the video encoder 22. The internal operation is basically the same as the flow of the audio decoding circuit 23, and detailed description is omitted.

Figure 21:
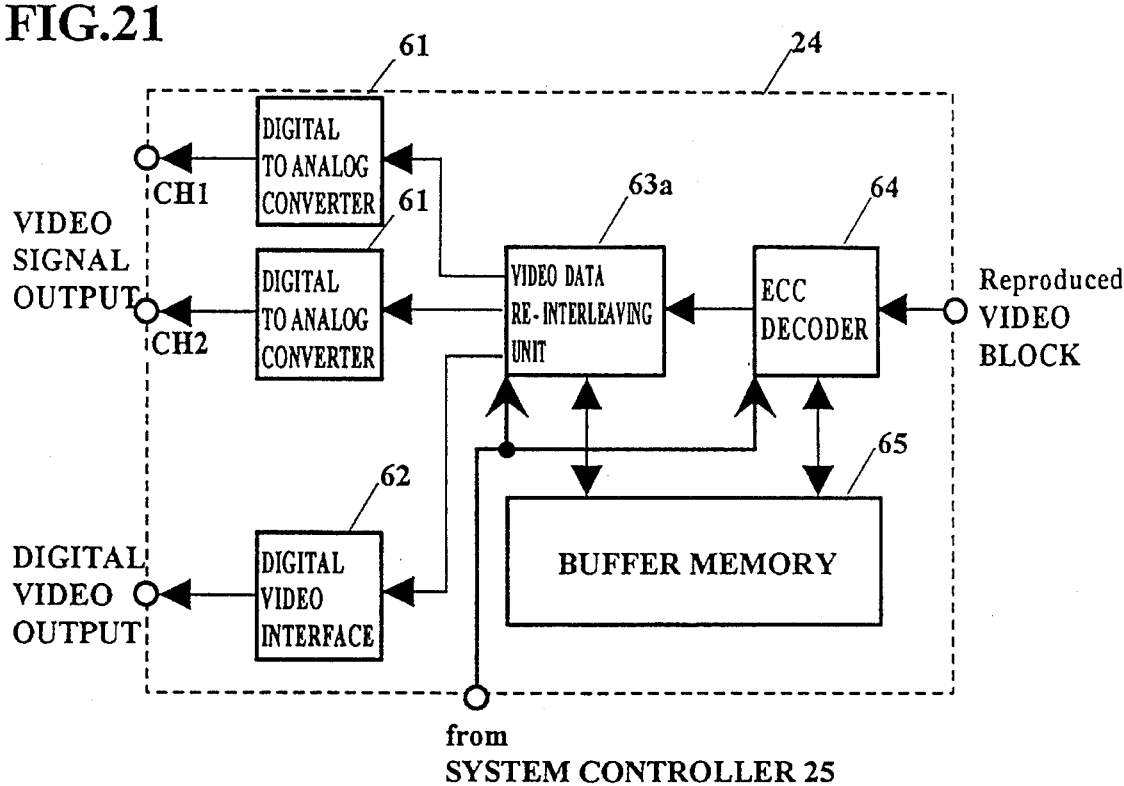
FIG. 21 is a diagram showing another example of internal constitution of a video decoding circuit in an embodiment of the invention.
Figure 23A:
FIG. 23a is a diagram showing an example of signal format on a sector of an upper outer area of an optical disk for recording four channels of audio signals and one channel of video signal.
Figure 23B:
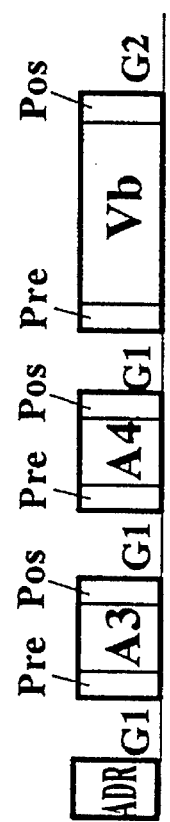
FIG. 23b is a diagram showing an example of signal format on a sector of a lower inner area of the same optical disk.
Figure 23C:
FIG. 23c is a diagram showing an example of signal format on a sector of a lower outer area of the same optical disk.
Figure 23D:
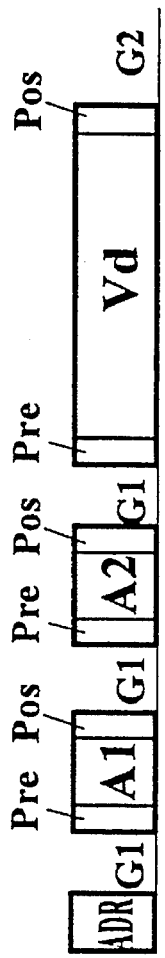
FIG. 23d is a diagram showing an example of signal format on a sector of an upper Inner area of the same optical disk.

In the case of an optical recording and reproducing apparatus using the video encoder 22 having the internal constitution as shown in FIG. 20, an example of internal constitution of the video decoder 24 becomes as shown in FIG. 21. That is, in the video data interleaving circuit 57a, the video signal is separated into the original two channels.

The optical recording and reproducing apparatus composed of the circuit blocks having the internal constitution as described above is capable of recording audio signals and video signals easily by distributing into the inner and outer areas of the optical disk.

The constitution of the apparatus for realizing post-scoring or pre-scoring is described below. For post-scoring or pre-scoring, the following functions may be added to the modulation recording circuit 17. That is, when recording by each optical head by tracing the tracks of the optical disk having the sector format as shown in FIGS. 3a to 3d, 22a to 22d, or 23a to 23d, the modulation recording circuit 17 judges whether or not to record in each recording area, and the power level of the laser may be changed.

Figure 19:
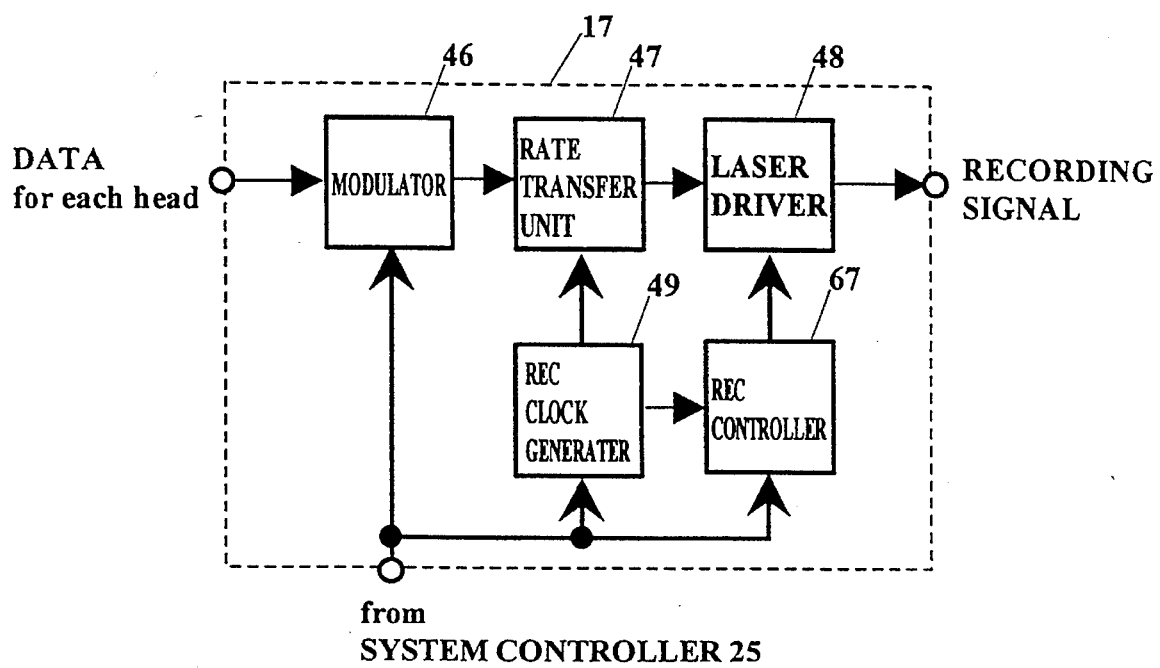
FIG. 19 is a diagram showing another example of internal constitution of a modulating and recording circuit in an embodiment of the invention.

To judge whether or not to record in each recording area, the modulation recording circuit 17 may recognize the sequence of the recording areas (for example, A1, A2, A3, A4, V), and the beginning and end of each area. In the case of the optical disk having the format as shown in FIGS. 3a to 3d, the length of each recording area is determined by the number of bits of the data as mentioned above. Besides, the number of bits to be recorded in the video signal recording areas (Va, Vb, Vc, Vd) differs zone by zone. Still more, because of the MCAV system, the frequency of the recording clock signal differs also zone by zone. Therefore, the length of each recording area can be judged by counting the clocks of the recording clock signal. On the other hand, since the address information is reproduced in the CAV system as mentioned above, the length of the address area ADR is defined by the time length. Besides the length of the address area ADR and gap areas G1, G2 can be judged by counting, for example, the clocks of an always constant frequency signal. Thus, by counting clocks of the recording clock signal of each zone and the clocks of a relatively high constant frequency signal, the starting position and ending position of each recording area can be judged. FIG. 19 is a block diagram showing an example of internal constitution of a modulation recording circuit possessing functions for post-scoring and pre-scoring. As compared with the internal constitution shown in FIG. 13, a record controller 67 is newly added. The record controller 67 is composed of, for example, a counter for counting clocks of the recording clock signal and a high frequency clock signal having a constant frequency. By counting the clocks, it is judged whether or not to record in each recording area in the sector, and the laser driver is controlled.

For example, when a command for post-scoring of audio signal of channel 3 is put into the system controller 25 from outside, the system controller 25 issues a command to set only the audio signal recording area for channel 3 into a recording mode to the record controller 67. Receiving this command, the record controller 67 controls the laser driver 48 so as to issue a pulse signal of recording power only in the corresponding audio signal recording area.

By using the modulation recording circuit 17 having such internal constitution, post-scoring or pre-scoring of audio signal or video signal of desired channel can be easily realized.

In this embodiment, four optical heads are used, but the number of the optical heads is not limited as far as it is two or more. Tracks are provided on both sides, but may be provided on one side only. The track is divided into six sectors at every 60 degrees, but the number of divisions is not limited, or it is not necessary to divide.

The time length of video signal and audio signal recorded in each sector may be set freely for the convenience of editing. For example, when the video signal is a television signal composed of 30 frames per second (60 fields), when the one track is divided into S sectors (S is a natural number), and the time length of the video signal recorded in one sector is set at a time period of (1/S) frame or (1/s) field, editing in every frame or field may be done easily.

What is claimed is:

1. An optical recording apparatus for recording video signals and audio signals on an optical disk having opposite sides at least one of which is divided in a radial direction into an inner area closer to a center of the disk and an outer area closer to an outer circumference of the disk, each of the inner and outer areas having formed therein spiral or concentric tracks each having at least one sector which has an address area having recorded therein address information identifying the sector, an audio signal recording area for recording therein an audio signal and a video signal recording area for recording therein a video signal, said apparatus comprising:

disk drive means for rotating the optical disk at a constant angular velocity;

a first optical head for accessing a sector in the inner area of the optical disk with a converged light to record a signal applied thereto onto the accessed sector;

a second optical head for accessing a sector in the outer area of the optical disk with a converged light to record a signal applied thereto onto the accessed sector;

audio signal encoding means for encoding a specific unit of an input audio signal to obtain a coded audio data;

video signal encoding means for encoding a specific unit of an input video signal to obtain a coded video data;

data distributing means for distributing each of the coded audio data and the coded video data to a first group of video data and audio data and a second group of audio data and video data at a specific distribution ratio;

a first modulating and recording means for modulating the first group of audio data and video data to obtain a first group of modulated audio data and modulated video data, and for applying the first group of modulated audio data and modulated video data to the first optical head to record the modulated audio data and the modulated video data in the first group into the audio signal recording area and the video signal recording area, respectively in a sector in the inner area of the optical disk; and a second modulating and recording means for modulating the second group of audio data and video data to obtain a second group of modulated audio data and modulated video data, and for applying the second group of modulated audio data and modulated video data to the second optical head to record the modulated audio data and the modulated video data in the second group into the audio signal recording area and the video signal recording area, respectively in a sector in the outer area of the optical disk.

2. An apparatus according to claim 1, wherein said audio signal encoding means divides the specific unit of input audio signal into a plurality of audio signal blocks and encodes the plurality of audio signal blocks to obtain a plurality of coded audio data blocks, said video signal encoding means divides the specific unit of input video signal into a plurality of video signal blocks and encodes the plurality of video signal blocks to obtain a plurality of coded video data blocks, and wherein said data distributing means distributes each of the plurality of coded audio data blocks and the plurality of coded video data blocks to the first and second groups of coded audio data and coded video data.

3. An apparatus according to claim 1, wherein each of the inner area and the outer area of the optical disk is divided in a radial direction of the optical disk into a plurality of zones each being composed of a specific number of tracks, and wherein said data distributing means changes the specific distribution ratio zone by zone.

4. An apparatus according to claim 1, wherein each of the sectors on the optical disk has a plurality of audio signal recording areas, and wherein said audio signal encoding means encodes a plurality of channels of specific units of input audio signals to obtain a plurality of channels of coded audio data, said data distributing means distributes the coded audio data in each of the plurality of channels to two groups to obtain a first group of plurality of channels of audio data and a second group of plurality of channels of audio data, said first modulating and recording means modulates the first group of plurality of channels of audio data to obtain a first group of plurality of channels of modulated audio data and applies the first group of plurality of channels of modulated audio data to the first optical head to record the plurality of channels of modulated audio data in the first group respectively into the plurality of audio signal recording areas in a sector in the inner area of the optical disk, and said second modulating and recording means modulates the second group of plurality of channels of audio data to obtain a second group of plurality of channels of modulated audio data and applies the second group of plurality of channels of modulated audio data to the second optical head to record the plurality of channels of modulated audio data in the second group respectively into the plurality of audio signal recording areas in a sector in the outer area of the optical disk.

5. An apparatus according to claim 1, wherein each of the sectors on the optical disk has a plurality of video signal recording areas, and wherein said video signal encoding means encodes a plurality of channels of specific units input video signals to obtain a plurality of channels of coded video data, said data distributing means distributes the coded video data in each of the plurality of channels to two groups to obtain a first group of plurality of channels of video data and a second group of plurality of channels of video data, said first modulating and recording means modulates the first group of plurality of channels of video data to obtain a first group of plurality of channels of modulated video data and applies the first group of plurality of channels of modulated video data to the first optical head to record the plurality of channels of modulated video data in the first group respectively into the plurality of video signal recording areas in a sector in the inner area of the optical disk and said second modulating and recording means modulates the second group of plurality of channels of video data to obtain a second group of plurality of channels of modulated video data and applies the second group of plurality of channels of modulated video data to the second optical head to record the plurality of channels of modulated video data in the second group respectively into the plurality of video signal recording areas in a sector in the outer area of the optical disk.

6. An apparatus according to claim 1, wherein said modulating and recording means includes: a counter for counting clocks of a clock signal having a fixed frequency;

an area judging means for judging positions of the audio signal recording area and the video signal recording area in each sector based on a count output of the counter; and a means for controlling recording in the positions judged by the judging means.

7. An optical reproducing apparatus for reproducing video signals and audio signals recorded on an optical disk, said optical disk having opposite sides at least one of which is divided in a radial direction into an inner area closer to a center of the disk and an outer area closer to an outer circumference of the disk, each of the inner and outer areas having formed therein spiral or concentric tracks each being divided into sectors at specific angular intervals, each of the sectors having an address area having recorded therein address information identifying the sector, an audio signal recording area having recorded therein a first group of modulated coded audio data and a video signal recording area having recorded therein a first group of modulated coded video data, said apparatus comprising:

disk drive means for rotating the optical disk at a constant angular velocity;

a first optical head for accessing a sector in the inner area of the optical disk with a converged light to reproduce from the accessed sector the first group of modulated coded audio data and the first group of modulated coded video data;

a second optical head for accessing a sector in the outer area of the optical disk with a converged light to reproduce from the accessed sector the second group of modulated coded audio data and the second group of modulated coded video data;

a first demodulating means for demodulating the first group of modulated coded audio data and the first group of modulated coded video data reproduced by the first optical head to obtain a first group of coded audio data and a first group of coded video data;

a second demodulating means for demodulating the second group of modulated coded audio data and the second group of modulated coded video data reproduced by the second optical head to obtain a second group of coded audio data and a second group of coded video data;

data combining means for combining the first group of coded audio data and the second group of coded audio data to obtain a combined coded audio data and for combining the first group of coded video data and the second group of coded video data to obtain a combined coded audio data;

audio decoding means for decoding the combined coded audio data to obtain a reproduced audio signal; and video decoding means for decoding the combined coded video data to obtain a reproduced video signal.

8. An optical recording and reproducing apparatus for recording video signals and audio signals on an optical disk and for reproducing the recorded signals from the optical disk, said optical disk having opposite sides at least one of which is divided in a radial direction into an inner area closer to a center of the disk and an outer area closer to an outer circumference of the disk, each of the inner and outer areas having formed therein spiral or concentric tracks each being divided into sectors at specific angular intervals, each of the sectors having an address area having recorded therein address information identifying the sector, an audio signal recording area for recording therein an audio signal and a video signal recording area for recording therein a video signal, said apparatus comprising:

disk drive means for rotating the optical disk at a constant angular velocity;

a first optical head for accessing a sector in the inner area of the optical disk with a converged light to record a signal applied thereto onto the accessed sector and to reproduce a signal from the accessed sector;

a second optical head for accessing a sector in the outer area of the optical disk with a converged light to record a signal applied thereto onto the accessed sector and to reproduce a signal from the accessed sector;

address information detecting means for detecting from signals reproduced by the first and second optical heads address information of the sectors accessed by the first and second optical heads;

optical head control means for moving the first and second optical heads to respective desired sectors based on the address information detected by the address information detecting means;

audio signal encoding means for encoding a specific unit of an input audio signal to obtain coded audio data;

video signal encoding means for encoding a specific unit of an input video signal to obtain coded video data;

data distributing means for distributing each of the coded audio data and the coded video data to a first group of video data and audio data and a second group of audio data and video data at a specific distribution ratio;

a first modulating and recording means for modulating the first group of audio data and video data to obtain a first group of modulated audio data and modulated video data, and for applying the first group of modulated audio data and modulated video data to the first optical head to record the modulated audio data and the modulated video data in the first group into the audio signal recording area and the video signal recording area respectively in a sector in the inner area of the optical disk; and a second modulating and recording means for modulating the second group of audio data and video data to obtain a second group of modulated audio data and modulated video data, and for applying the second group of modulated audio data and modulated video data to the second optical head to record the modulated audio data and the modulated video data in the second group into the audio signal recording area and the video signal recording area, respectively in a sector in the outer area of the optical disk;

a first demodulating means for demodulating the modulated audio data and modulated video data in the first group reproduced by the first optical head to obtain a first group of coded audio data and coded video data;

a second demodulating means for demodulating the modulated audio data and modulated video data in the second group reproduced by the second optical head to obtain a second group of coded audio data and coded video data;

data combining means for combining the first group of coded audio data and the second group of coded audio data to obtain a combined coded audio data and for combining the first group of coded video data and the second group of coded video data to obtain a combined coded audio data;

audio decoding means for decoding the combined coded audio data to obtain a reproduced audio signal; and video decoding means for decoding the combined coded video data to obtain a reproduced video signal.

* * * * *